(12) United States Patent
Altinier et al.

(10) Patent No.: US 10,988,883 B2
(45) Date of Patent: Apr. 27, 2021

(54) METHOD FOR THE DETERMINATION OF A LAUNDRY WEIGHT IN A LAUNDRY TREATMENT APPLIANCE

(71) Applicant: Electrolux Appliances Aktiebolag, Stockholm (SE)

(72) Inventors: Fabio Altinier, Porcia (IT); Elena Pesavento, Porcia (IT); Alessandro Beghi, Padua (IT); Gian Antonio Susto, Padua (IT); Giuliano Zambonin, Padua (IT); Giulia Zannon, Padua (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 264 days.

(21) Appl. No.: 16/078,474

(22) PCT Filed: Feb. 23, 2016

(86) PCT No.: PCT/EP2016/053788
§ 371 (c)(1),
(2) Date: Aug. 21, 2018

(87) PCT Pub. No.: WO2017/144085
PCT Pub. Date: Aug. 31, 2017

(65) Prior Publication Data
US 2019/0301071 A1  Oct. 3, 2019

(51) Int. Cl.
*D06F 39/00* (2020.01)
*D06F 34/18* (2020.01)
(Continued)

(52) U.S. Cl.
CPC ............ *D06F 34/18* (2020.02); *D06F 29/005* (2013.01); *D06F 33/00* (2013.01); *D06F 34/28* (2020.02);
(Continued)

(58) Field of Classification Search
CPC ........ D06F 58/30; D06F 58/38; D06F 29/005; D06F 33/00; D06F 37/304; D06F 39/088;
(Continued)

(56) References Cited

U.S. PATENT DOCUMENTS

| | | | |
|---|---|---|---|
| 5,899,005 A * | 5/1999 | Chen ....................... | D06F 58/30 34/528 |
| 6,038,724 A | 3/2000 | Chbat et al. | |

(Continued)

FOREIGN PATENT DOCUMENTS

| | | | | |
|---|---|---|---|---|
| EP | 0704568 A1 | 4/1996 | | |
| EP | 0760877 B1 * | 8/2001 | ............. | D06F 34/18 |

(Continued)

OTHER PUBLICATIONS

European Communication Pursuant to Article 94(3) EPC for European Application No. 16 707 034.1, dated Jun. 23, 2020, 6 pages.
(Continued)

*Primary Examiner* — Tinsae B Ayalew
(74) *Attorney, Agent, or Firm* — RatnerPrestia

(57) ABSTRACT

A method for the determination of a laundry weight in a laundry treatment appliance. The method includes selecting a laundry program in the laundry treatment appliance; starting the selected laundry program; sensing a plurality of parameters indicating operating conditions of the laundry treatment appliance during the laundry program; and predicating a weight of the laundry present within the laundry treatment appliance based on said plurality of parameters by means of a data-driven soft sensor.

13 Claims, 19 Drawing Sheets

(51) Int. Cl.

| | |
|---|---|
| *G06N 20/00* | (2019.01) |
| *D06F 29/00* | (2006.01) |
| *D06F 37/30* | (2020.01) |
| *D06F 39/08* | (2006.01) |
| *G06N 7/00* | (2006.01) |
| *D06F 33/00* | (2020.01) |
| *D06F 34/28* | (2020.01) |
| *D06F 58/30* | (2020.01) |
| *D06F 25/00* | (2006.01) |
| *D06F 58/38* | (2020.01) |
| *D06F 103/02* | (2020.01) |
| *D06F 103/04* | (2020.01) |
| *D06F 103/08* | (2020.01) |

(52) U.S. Cl.
CPC .......... *D06F 37/304* (2013.01); *D06F 39/088* (2013.01); *D06F 58/30* (2020.02); *G06N 7/00* (2013.01); *G06N 20/00* (2019.01); *D06F 25/00* (2013.01); *D06F 58/38* (2020.02); *D06F 2103/02* (2020.02); *D06F 2103/04* (2020.02); *D06F 2103/08* (2020.02); *D06F 2202/04* (2013.01); *D06F 2202/10* (2013.01); *D06F 2202/12* (2013.01); *D06F 2204/065* (2013.01)

(58) Field of Classification Search
CPC ............. D06F 2103/08; D06F 2103/04; D06F 2103/02; D06F 25/00; D06F 2202/04; D06F 2202/12; D06F 2202/065; G06N 7/00
USPC .......................................................... 8/159
See application file for complete search history.

(56) References Cited

U.S. PATENT DOCUMENTS

| | | | |
|---|---|---|---|
| 6,122,840 | A | 9/2000 | Chbat et al. |
| 2010/0139011 | A1 | 6/2010 | Kim et al. |

FOREIGN PATENT DOCUMENTS

| | | | |
|---|---|---|---|
| EP | 2221412 | A1 | 8/2010 |
| EP | 2610401 | A1 | 7/2013 |
| EP | 2653602 | A1 | 10/2013 |
| WO | 9629457 | A1 | 9/1996 |

OTHER PUBLICATIONS

International Search Report and Written Opinion for International Application No. PCT/EP2016/053788, dated Jun. 14, 2016—13 pages.

\* cited by examiner

METHOD FOR THE DETERMINATION OF A LAUNDRY WEIGHT IN A LAUNDRY TREATMENT APPLIANCE

CROSS REFERENCE TO RELATED APPLICATIONS

This application is a U.S. National Phase application of PCT International Application No. PCT/EP2016/053788, filed Feb. 23, 2016, which is incorporated by reference herein.

BACKGROUND OF THE INVENTION

The present invention relates to a method to determine the weight of items, e.g. clothes and the like, which are introduced in a laundry treatment appliance.

The estimation of the laundry quantity—that is its weight—loaded in the drum of a laundry treatment machine is an important information used to set various washing and/or drying cycle parameters.

Without a specific weight sensor, a common way of having an estimation of the laundry quantity is—in washing machines—through an algorithm based on the water absorbed by the laundry. The amount of water loaded, during the water load phase in a washing cycle, is proportional to the amount and type of laundry present in the drum; based on the amount of water, an algorithm estimates the laundry quantity in the drum.

In dryers, a signal function of the electrodes in contact to the laundry can be for example used to determine the weight of the laundry present in the drum.

The above mentioned indirect measure of the laundry load takes several minutes (up to 15 minutes) and does not really give an exact indication of the laundry weigh, for example because the same weight of different textiles absorbs different water quantity.

The use of a real weight sensor in order to obtain the value of the weight load is generally not feasible in standard laundry treatment appliance, due to the high costs and the possible presence of water.

SUMMARY OF THE INVENTION

The present invention relates to a method to have an accurate and/or fast prediction of the laundry weight (for example less than a minute), that is the weight of the laundry inserted in a drum of the laundry treatment appliance, without the use of expensive sensors or tools beyond those generally used in laundry treatment appliances.

A goal of the invention is therefore to provide for a determination of the weight of the laundry introduced in the laundry treatment appliance that is reliable, and at the same time keeping the overall costs of the appliance substantially unchanged or only slightly modified.

According to a first aspect, the invention relates to a method for the determination of a laundry weight in a laundry treatment appliance comprising:
  selecting a laundry program in the laundry treatment appliance;
  starting the selected laundry program;
  sensing a plurality of parameters indicating operating conditions of the laundry treatment appliance during the laundry program; and
  predicting a weight of the laundry present within the laundry treatment appliance based on said plurality of parameters by means of a data-driven soft sensor.

The laundry treatment appliance of the invention is a washing and/or drying appliance which may include a washing machine, a drier or a combined washer-dryer. The appliance includes a washing and/or drying chamber—such as a drum—where the laundry can be located in order to be washed and/or dried; the chamber can be rotated around a chamber axis during the washing and/or drying operations. The laundry includes items such as clothes, towels, accessories, etc. realized in many different materials.

The laundry introduced in the laundry chamber or drum is the subject of the weight determination.

Further, the appliance may be a front-loading washing machine, dryer, or washer dryer, which means that the axis of rotation of the laundry chamber is positioned in a horizontal manner or slightly tilted with respect to a horizontal plane, or a top laundry washing machine, dryer or washer-dryer, where the axis of the laundry chamber is substantially vertical.

Generally, in a top loading or vertical axis washing machine or washer dryer, the laundry is introduced in a vertically mounted perforated basket (the drum) that is contained within a water-retaining tub, with a finned water-pumping agitator in the center of the bottom of the basket. During the wash cycle, the outer tub is filled with water sufficient to fully immerse and suspend the laundry freely in the basket. The movement of the agitator pushes water outward between the paddles towards the edge of the tub. The water then moves outward, up the sides of the basket, towards the center, and then down towards the agitator to repeat the process, in a circulation pattern similar to the shape of a torus. The agitator direction is preferably periodically reversed. Some washers supplement the water-pumping action of the agitator with a large rotating screw on the shaft above the agitator, to help move water downwards in the center of the basket.

In most top-loading washers, if the motor spins in one direction, the gearbox drives the agitator; if the motor spins the other way, the gearbox locks the agitator and spins the basket and agitator together. Similarly, if the pump motor rotates one way it recirculates the sudsy water; in the other direction it pumps water from the machine during the spin cycle.

The front-loading or horizontal-axis laundry washing machine or washer dryer mounts the inner basket (drum) and outer tub horizontally or slightly tilted from a horizontal plane, and loading is through a door at the front of the machine. The door often but not always contains a transparent window. Agitation is supplied by the back-and-forth rotation of the drum and by gravity. The laundry is commonly lifted up by paddles on the inside wall of the drum and then dropped. This motion flexes the weave of the fabric and forces water and detergent solution through the laundry load.

Generally, the front loading washing machine or washer dryer also includes a main motor (a universal motor or variable-frequency drive motor) normally connected to the drum via a pulley belt and a pulley wheel, without the need for a gearbox, clutch or crank.

The laundry treatment appliance of the invention can also include a laundry dryer, which, in addition to a rotatable drum where the laundry is introduced to be dried, it is also provided with an open-circuit or closed-circuit hot-air generator, which is housed within the appliance casing and preferably supported by a support base, and with one or more electronic control units which control both the electric motor and the hot-air generator during the performing of user-selectable drying cycles stored in the central electronic control unit.

The open-circuit or closed-circuit hot-air generator is structured to circulate, in use, inside the drum a stream of hot air having a low moisture content, to dry the laundry placed inside the drum itself.

In today's laundry dryers, the hot-air generator is usually a closed-circuit, heat-pump type hot-air generator comprising: an air circulating conduit having its two ends connected to respective opposite sides of the drum; an electric fan located along the air circulating conduit to produce inside the latter an airflow which flows through the drum; a heat-pump assembly, having its two heat exchangers located one downstream of the other, along the air circulating conduit; and preferably also a manually-removable filtering element, which is fixed at an inlet of the air circulating conduit located upstream of the two heat exchangers, and which is configured to retain lint or fluff carried by the drying air flow upstream of the two heat exchangers and of the electric fan.

The heat pump of the laundry appliance includes a refrigerant circuit in which a refrigerant can flow and which connects via piping a first heat exchanger or condenser, a second heat exchanger or evaporator, a compressor and a pressure-lowering device. The refrigerant is pressurized and circulated through the system by the compressor. On the discharge side of the compressor, the hot and highly pressurized vapor is cooled in the first heat exchanger, called the condenser, until it condenses into a high pressure, moderate temperature liquid, heating up the process air before the latter is introduced into the drying chamber. The condensed refrigerant then passes through the pressure-lowering device such as an expansion device, e.g., a choke, a valve or a capillary tube. The low pressure liquid refrigerant then enters the second heat exchanger, the evaporator, in which the fluid absorbs heat and evaporates due to the heat exchange with the warm process air exiting the drying chamber. The refrigerant then returns to the compressor and the cycle is repeated.

In all the above mentioned non-limiting embodiments, the laundry treatment appliance (in the following only "appliance") preferably comprises a casing preferably including a front wall, a rear wall, side walls, top wall and a base section or basement. The front or top wall may comprise a user panel to command the functioning of the appliance by the user. The casing defines the limit between the internal volume of the appliance and the outside to the appliance. Further, preferably, the casing includes a door hinged to the casing itself, e.g. to the front wall in case of a front loading appliance, which is openable in order to introduce the laundry in the laundry chamber, or to the top wall in case of a top loading appliance.

The basement has, among others, preferably the function of housing several component of the machine, such as a portion of a drying air conduit, heat exchangers, a motor for rotating the chamber, a fan, etc. Further, it has also the function of supporting some of the walls of the casing, for example the rear wall. The rear wall is fixed to the basement when the appliance is in an assembled position.

The basement is generally positioned on a floor and rests substantially horizontally when the machine is in a standard operating condition. The basement defines a basement plane, which is substantially parallel to the plane where it rests, e.g. a horizontal plane. The basement may also include an upper surface, which is the surface facing upwardly when the basement is in a standard operative configuration of the machine. The upper edge surface is the portion of the upper surface that surrounds the edge of the basement, contouring the same.

The appliance of the invention includes a selector, for example operable by the user, with which a plurality of programs, that is, washing and/or drying cycles can be alternatively selected. A laundry treatment machine generally includes a plurality of laundry programs each designed to treat laundry made of a specific textile type or composition or type of dirt or stain. For example, in a washing machine, a cotton cycle program at high temperature is generally present, as well as a delicate cycle program for delicate textiles (e.g. silk) at lower temperatures. Similarly, in a drying machine also a plurality of programs is generally present, such as a cotton cycle program at high temperature for cotton textile; permanent press, which generally refers to coloured garments and utilizes medium heat; the knits/delicate cycle program is for delicate textiles which cannot withstand very much heat; the delicate cycle program uses air slightly above room temperature to gently and slowly dry fragile garments, etc. Therefore, generally the cycle program is selected depending on the type of textile to be dried and/or washed and/or on the type of dirt or stains that are on the laundry or on the humidity desired at the end of the drying (iron program).

Each cycle program can differ from the other cycle program by a plurality of different settings, such for example the temperature of the water or process air which flows inside the drum to wash or dry the textile, the time duration of the program, the speed of revolution of the drum, the number of changes in direction of revolution of the drum, the velocity of the spinning, the degree of humidity at which the textile is considered to be dry and the program terminated, the amount of detergent used, etc. All these settings and the corresponding program lines for each program are for example included in a memory of the laundry treatment, for example in a main controller circuit or unit of the laundry treatment appliance. Further, each program, although preferably not visible to the user, may include one or more settings for the motor operation (that is, the motor rotating the drum) or the heat pump operation, etc.

Preferably, the laundry treatment appliance includes also a visualization element to visualize information related to the selected drying and/or washing program. This visualization element can be a simple light which turn on or off to indicate the start or stop of a phase of the selected program (such as a different light can turn on in case of warming up phase—washing or rinsing) or a display in which information in sentences or words or figures can be displayed. The visualization element can also indicate actions to be performed by the user, such as for example the introduction of a detergent or addictive and the like.

Further, the laundry treatment appliance of the invention includes a plurality of sensors to sense a plurality of operating conditions of the appliance during the selected program, that is, during the selected drying or washing cycle. These operating conditions may include one or more values or parameters as in the following list, depending also on the type of appliance considered:

parameters indicative of the operating conditions of the motor driving the drum in rotation, such as a motor torque value and/or a power absorbed by the motor and/or a current absorbed by the motor;

temperature of the water in different positions of a water circuit of the appliance;

temperature of the process air in different positions of a process air circuit of the appliance;

speed or acceleration of the drum or number of times in which the drum reverses its rotation direction;
speed or acceleration of an agitator located in the drum to move the laundry located therein;
temperature of the refrigerant in a refrigerant circuit or operating conditions of a compressor in a heat pump system;
parameters indicative of operating conditions of a motor driving a process fan in rotation;
humidity of the laundry and variations thereof;
amount of water in the appliance and variations thereof;
time from the beginning of the selected program and/or phase of the program which is taking place;
parameters indicative of operating conditions of mechanical elements of the appliance, like the opening or closing of valves, the activations of alarms and so on; etc.

These values may depend on the type of laundry treatment appliance (e.g. dryer, washing machine, etc.) and/or on the selected washing and/or drying program.

These values can be also elaborated by the controller unit of the appliance so that, for example, they can be averaged, integrated, summed, etc.

Preferably, these sensors outputting one or more of the values/parameters above listed are commonly present in the appliance, that is, the values obtained from these sensors are generally used to control the correct functioning of the appliance and to perform the selected program.

Therefore, preferably no "ad hoc" sensor is added to the appliance in order to perform the method according to the invention.

Further, these values indicative of operating conditions of the appliance and sensed by sensors are preferably sensed during the whole program, that is, during the whole time in which the appliance is operative, or only during specific time intervals or only during specific phases of the selected laundry program or cycle. For example, a washing cycle can be divided in a washing, rising and spinning phases and the values above sensed are sensed during only one of these phases.

Preferably, the number of parameters used, that is, the number of inputs as detailed below, is comprised between 4 and 20.

Based on the values of these operating conditions, a prediction is made of the value of the weight of the laundry which has been introduced within the laundry treatment appliance, for example inside the drum. This prediction is performed by a soft sensor.

The weight of the laundry in a laundry treatment appliance is a quantity that is either unmeasurable or costly/time-consuming to obtain. Therefore in the present invention a statistical model-based technology addressed to industrial environments that provide an estimate of such quantity is used. The primary purpose of sensors is to deliver data for process monitoring and control. In the context of process industry, predictive models are called Soft Sensors: term is a combination of the words "software", because the models are usually—but not necessarily—computer programs, and "sensors", because the models are delivering similar information as their hardware counterparts. Other common terms for predictive sensors in the process industry are inferential sensors, virtual sensor or on-line analyser and observer-based sensors.

Two different classes of Soft Sensors, namely model-driven and data-driven, can be distinguished.

Model-driven models are also called white-box models because they have full phenomenological knowledge about the process background. In contrast to this purely, data-driven models are called black-box techniques because the model itself has no knowledge about the process and is based on empirical observations of the process. In between the two extremes there are many combinations of these two major types of models possible. A typical example of such a combination is a model-driven Soft Sensor making use of data-driven method for the modelling of fractions which can not be modelled easily in terms of phenomenological models.

The present invention uses a data driven model, being based on empirical data. Therefore a data-driven soft sensor is an inferential statistical model developed from process observations.

The soft sensor, which normally operates using a software, might be embedded in the control unit of the appliance. The same control unit—as already stated—preferably controls also the appliance during its functioning, that is, during the execution of the selected laundry program, for example sending command signals to the motor of the drum and to the other components participating in the correct functioning of the appliance. For example, in a heat pump dryer, the control unit sends command signals to the heat pump.

In this way, making use of values from sensors which are already available in the appliance for other purposes, and the same processor already used to control the proper functioning of the appliance, the weight of the laundry introduced inside the laundry treatment appliance is predicted. This prediction is obtained by means of a statistical method by means of a soft sensor which is data driven. The operation of "training" the soft sensor is preferably performed in the production site. Without adding further elements (such as a new sensor) to the appliance, a prediction of the weight of the laundry is obtained.

Preferably, said step of predicting a weight of the laundry by means of a data driven soft sensor includes a step of predicting a weight of the laundry by means of a supervised learning prediction.

In supervised learning, from input data (in this case the values of the operating conditions of the appliance) are used to predict an output value (in this case the weight of the laundry).

In supervised learning, input data is called training data. A model is prepared through a training process where it is required to make predictions and is corrected when those predictions are wrong. The training process continues until the model achieves a desired level of accuracy on the training data. Preferably, the soft sensor of the invention uses a supervised learning method, that is a learning task of inferring a function from labelled training data. The training data consist of a set of training examples. In supervised learning, each example is a pair consisting of an input object (typically a vector) and a desired output value (also called the supervisory signal). A supervised learning algorithm analyses the training data and produces an inferred function, which can be used for mapping new examples.

In the present invention therefore, the soft sensor uses the operating conditions of the appliance during the selected program and the output value includes the weight of the laundry present in the drum of the laundry treatment appliance. This is done after the algorithm had been properly trained by the training examples which are data collected in field tests of the appliance.

In order to solve a given problem of supervised learning, such as the prediction of the weight of the laundry, the following steps are generally preferably performed:

1. Determine the type of training examples.
2. Gather a training set. The training set needs to be representative of the real-world use of the function. Thus, a set of input objects is gathered and corresponding outputs are also gathered, either from human experts or from measurements.
3. Determine the input feature representation of the learned function. The accuracy of the learned function depends strongly on how the input object is represented. Typically, the input object is transformed into a feature vector, which contains a number of features that are descriptive of the object.
4. Determine the structure of the learned function and corresponding learning algorithm.
5. Complete the design. Run the learning algorithm on the gathered training set. Some supervised learning algorithms require the user to determine certain control parameters. These parameters may be adjusted by optimizing performance on a subset (called a validation set) of the training set, or via cross-validation. In the present invention cross-validation is used.
6. Evaluate the accuracy of the learned function. After parameter adjustment and learning, the performance of the resulting function is preferably measured on a test set that is separate from the training set.

The above steps have been performed by the Applicant and the training set is a set of measures which are obtained during the laundry treatment testing in the Applicant labs.

Supervised learning splits into two broad categories: classification and regression.

In classification, the goal is to assign a class (or label) from a finite set of classes to an observation. That is, responses (outputs) are categorical variables.

In regression, the goal is to predict a continuous measurement for an observation. That is, the responses variables (outputs) are real numbers.

Given a set of N training examples of the form $\{(x_1, y_1), \ldots, (x_N, y_N)\}$ such that $x_i$ is the feature vector of the i-th example and $y_i$ is its label (i.e., class), a supervised learning algorithm seeks a function g: X→Y, where X is the input space (that is, the space which includes the input values, in this case the values of the operating conditions of the appliance) and Y is the output space (in this case, the space which contains the weight of the laundry). The function g is an element of some space of possible functions G. It is sometimes convenient to represent g using a scoring function $f: X \times Y \to \mathbb{R}$ such that g is defined as returning the y value that gives the highest score:

$$g(x) = \arg\max_{y} f(x, y)$$

Let F denote the space of scoring functions.

Although G and F can be any space of functions, many supervised learning algorithms are probabilistic models where g takes the form of a conditional probability model $g(x)=P(y|x)$, or $f$ takes the form of a joint probability model $f(x, y)=P(x, y)$.

There are two basic approaches to choosing $f$ or $g$: empirical risk minimization and structural risk minimization. Empirical risk minimization seeks the function that best fits the training data. Structural risk minimization includes a penalty function that controls the bias/variance trade-off.

In both cases of supervised training, it is assumed that the training set consists of a sample of independent and identically distributed pairs, $(x_i, y_i)$. In order to measure how well a function fits the training data, a loss function L: Y×Y→$\mathbb{R}^{\geq 0}$ is defined. For training example $(x_i, y_i)$, the loss of predicting the value $\hat{y}$ is $L(y_i, \hat{y})$.

Preferably, said step of predicting a weight includes predicting a weight based on one or more characteristics of the selected laundry program.

The algorithm which is chosen in the data driven soft sensor takes preferably as inputs not only values given by sensors relative to operating conditions of the appliance, but also information that can be derived from the selected laundry program. For example, if the laundry program is synthetic, assumptions on the quantity of water absorbed by the laundry or on the drying time to dry such a laundry can be made. Further, knowledge on the phases of the selected program is also acquired. These values or parameters are fed as inputs to the algorithm running in the data driven soft sensor which is capable of giving the prediction of the weight of the laundry.

More inputs are used for the prediction of the weight, generally a better prediction is made, however a higher complexity and time is required to obtain the prediction itself. A proper trade-off is thus preferably selected between accuracy and the number of parameters used as input.

As mentioned, the number of parameters used as inputs for the soft sensor in order to perform the prediction of the weight of the laundry is comprised between 4 and 20. Commonly, a laundry treatment appliance does not have a dedicated processor for the prediction calculation. Generally the same processor that is used to control the appliance functions is used also to integrate the soft sensor, that is, the prediction algorithm. Therefore, the number of variables to be handled in the soft sensor is preferably kept rather "low" so that the capabilities of the available processors are not saturated.

Preferably, said laundry treatment appliance includes a rotatable drum and a motor to rotate said drum and said plurality of parameters includes one or more parameters indicative of operating conditions of the motor of the laundry treatment appliance.

One of the parameters which are given as input to the soft sensor is an operating condition of the motor which rotates the drum. In the drum, the laundry is introduced, in order for example to be washed and/or dried. This operating condition may refer to the torque applied to the drum by the motor, to the power absorbed by the motor, to the current absorbed by the motor, to the temperature of the motor or to quantities which are derived by the ones mentioned above, such as an integral of the torque in a time interval, an integral of the current in a given time interval, and so on. These operating conditions can be obtained in a specific time interval or during a predetermined phase during the execution of the selected laundry program.

Advantageously, said step of predicting a weight of the laundry by a supervised learning prediction includes predicting a weight of the laundry using a regression algorithm.

All supervised learning methods, as above mentioned, start with an input data matrix, usually called X. Each row of X represents one observation. Each column of X represents one variable, or predictor.

The response data Y is in this case including the weight of the laundry. Each element in Y represents the response to the corresponding row of X. For regression, Y must be a numeric vector with the same number of elements as the number of rows of X. For classification, Y can be any of these data types. This table also contains the method of including missing entries.

The relationship between the input data or variables and output variables has to be determined. More specifically, it is searched how the typical value of the dependent or output variable changes when any one of the independent or input variables is varied, while the other independent variables are held fixed.

Regression analysis is a statistical process for estimating the relationships among variables. It includes many techniques for modelling and analysing several variables, when the focus is on the relationship between a dependent variable and one or more independent variables (or 'predictors'). More specifically, regression analysis helps one understand how the typical value of the dependent variable (or 'criterion variable') changes when any one of the independent variables is varied, while the other independent variables are held fixed. Most commonly, regression analysis estimates the conditional expectation value of the dependent variable given the independent variables—that is, the average value of the dependent variable when the independent variables are fixed. In all cases, the estimation target is a function of the independent variables called the regression function. In regression analysis, it is also of interest to characterize the variation of the dependent variable around the regression function which can be described by a probability distribution.

The name "regression algorithm" may be confusing because regression can be used to refer to the class of problems and the class of algorithm and a regression algorithm can be used both in a regression problem and in a classification problem.

In order to obtain the weight of the laundry prediction, an algorithm needs to be selected, and this algorithm is a function of the independent variables called the regression function.

Regression models involve the following variables:

The unknown parameters, denoted as w, which may represent a scalar or a vector.
The independent or input variables, X.
The dependent or output variable, Y.
A regression model relates Y to a function of X and w.

$$Y \approx f(X;w) \qquad \text{Equation (1)}$$

To carry out regression analysis, the form of the function $f$ is to be specified. Sometimes the form of this function is based on knowledge about the relationship between Y and X that does not rely on the data. If no such knowledge is available, a flexible or convenient form for $f$ is chosen.

The most popular regression algorithms are:
Ordinary Least Squares Regression (OLSR)
Linear Regression
Logistic Regression
Stepwise Regression
Multivariate Adaptive Regression Splines (MARS)
Locally Estimated Scatterplot Smoothing (LOESS)

More preferably, said step of predicting a weight of the laundry using a regression analysis includes predicting a weight of the laundry using a linear model or a generalized linear model.

In order to choose the proper algorithm in a soft sensor, several characteristics of algorithms are preferably taken into consideration, because a tradeoff among them is generally needed. These characteristics are for example:

Speed of training
Memory usage
Predictive accuracy on new data
Transparency or interpretability, meaning how easily the reasons an algorithm makes its predictions can be understood.

A relatively simple model is for example a linear model, that is a linear algorithm: a regression in which the target value is expected to be a linear combination of the input variables.

A linear model can be described as follows. In mathematical notion, if $\hat{y}$ is the predicted value (see equation (1)):

$$\hat{y}(w,x) = w_0 + w_1 x_1 + \ldots + w_p x_p \qquad \text{Equation (2)}$$

A linear regression algorithm is a linear model with coefficients $w=(w_1, \ldots w_p)$ to minimize the residual sum of squares between the observed responses in the dataset, and the responses predicted by the linear approximation. Mathematically it solves a problem of the form:

$$\min_{w} \|Xw - y\|_2^2$$

However, coefficient estimates for Ordinary Least Squares rely on the independence of the model terms. When terms are correlated and the columns of the design matrix X have an approximate linear dependence, the design matrix becomes close to singular and as a result, the least-squares estimate becomes highly sensitive to random errors in the observed response, producing a large variance. This situation of multicollinearity can arise, for example, when data are collected without an experimental design.

An extension to this model in order to overcome these problems is by using a generalized linear model or algorithm.

Preferably, the step of predicting a weight of the laundry using a regression algorithm includes predicting a weight of the laundry using a regularized regression algorithm.

In a regularized regression algorithm, models are penalized based on their complexity, favoring simpler models that are also better at generalizing.

As know, in a standard linear algorithm, overfitting occurs when a model captures idiosyncrasies of the input data, rather than generalizing. Too many parameters relative to the amount of training data. For example, an order—N polynomial can be exact fit to N+1 data points.

In general, a regularization term $R(f)$ is introduced to a general loss function:

$$\min_{f} \sum_{i=1}^{n} V(f(\hat{x}_i), \hat{y}_i) + \lambda R(f)$$

for a loss function V that describes the cost of predicting $f(x)$ when the label is y, such as the square loss or hinge loss, and for the term $\lambda$ which controls the importance of the regularization term. $R(f)$ is typically a penalty on the complexity of $f$, such as restrictions for smoothness or bounds on the vector space norm.

Regularization can be used to learn simpler models, induce models to be sparse, introduce group structure into the learning problem, and more.

The parameter $\lambda$ is obtained by means of cross-validation. In the present invention preferably a Monte Carlo Cross validation is used.

The preferred regularization algorithms are:
Ridge Regression
Least Absolute Shrinkage and Selection Operator (LASSO)
Elastic Net
Least-Angle Regression (LARS)

More preferably, said step of predicting a weight of the laundry using a regularized regression algorithm includes predicting a weight of the laundry using a LASSO regression or a ridge regression.

Ridge regression imposes a penalty on the size of coefficients, that is, given the equation above, it can be written as:

$$\min_w \sum_{i=1}^{n} V(\hat{x}_i \cdot w, \hat{y}_i) + \lambda \|w\|_2^2 \qquad \text{Equation (3)}$$

When learning a linear function, such that $f(x)=w \cdot x$, the $L_2$ norm loss corresponds to ridge regularization ($L2=\|w\|_2^2$).

The Lasso is a linear model that estimates sparse coefficients. The norm above written is called in the Lasso case L1. It is useful in some contexts due to its tendency to prefer solutions with fewer parameter values, effectively reducing the number of variables upon which the given solution is dependent. For this reason, the Lasso and its variants are fundamental to the field of compressed sensing. Under certain conditions, it can recover the exact set of non-zero weights.

Mathematically, it consists of a linear model trained with L1 (L1=norm here used) prior as regularizer. The objective function to minimize is:

$$\min_w \frac{1}{2n_{samples}} \|Xw - y\|_2^2 + \alpha \|w\|_1$$

The lasso estimate thus solves the minimization of the least-squares penalty with $\alpha \|w\|_1$ added, where $\alpha$ is a constant and $\|w\|_1$ is the L1-norm of the parameter vector.

Elastic Net is a linear regression model trained with L1 and L2 prior as regularizer. This combination allows for learning a sparse model where few of the weights are non-zero like Lasso, while still maintaining the regularization properties of Ridge.
Elastic-net is useful when there are multiple features which are correlated with one another. Lasso is likely to pick one of these at random, while elastic-net is likely to pick both.
A practical advantage of trading-off between Lasso and Ridge is it allows Elastic-Net to inherit some of Ridge's stability under rotation.
The objective function to minimize is in this case $$\min_w \frac{1}{2n_{samples}} \|Xw - y\|_2^2 + \alpha\rho\|w\|_1 + \frac{\alpha(1-\rho)}{2}\|w\|_2^2$$

Selected the algorithm such as a regularized algorithm, the algorithm needs to be trained and validated. This training and validation is performed using available data set and using preferably a Monte Carlo cross-validation.

Preferably, the laundry treatment appliance is a vertical axis or a horizontal axis laundry machine or a laundry washer-dryer including a rotatable drum and, after the step of starting the select program, the method includes:

performing a plurality of commutations of the drum, each drum commutation having an acceleration portion and a deceleration portion;
loading water into the drum;
and the step of sensing a plurality of parameters includes:
sensing a plurality of parameters indicating operating conditions of the laundry treatment appliance during one or more commutations.

In a vertical axis washing machine or washer dryer, any program which can be selected in the laundry treatment appliance by the user or automatically possibly includes the following steps. A first step is called "Warm up" step, where there is no water yet loaded inside the appliance, but only the laundry has been introduced inside a drum of the appliance in order to be dried and/or washed. During this step, the drum is accelerated and decelerated, as a "burst", in several repetitive steps in order to move the laundry located inside it. Possibly but not necessarily, from one to the subsequent acceleration-deceleration bursts, the rotation direction of the drum is reversed. This bursts of acceleration-deceleration are called in the following commutations, as better detailed below. The word "commutation" is used to indicate that in a commutation the speed of the drum changes. In each of the commutations, the speed of the drum is raised from zero to a maximum value to return to zero or to a constant value for a number N of repetitions. This speed profile, which includes preferably an acceleration portion, a portion in which the speed is substantially constant and a deceleration portion is called commutation of the drum. In a vertical laundry machine or washer dryer, during the commutation, the agitator of the drum moves together with the drum, that is the rotational velocity of the drum and of the agitator is the same, they moves as a single object.

After the warm up step, a water loading step takes place, after which a strokes phase is implemented. A stroke is, as in the warm up phase, a substantially sudden movement of the agitator which includes an acceleration step and a deceleration step, so that the rotational velocity of the agitator increases from 0 to a maximum value to return back to zero. The acceleration of the agitator during a stroke is high, that is the agitator reaches rapidly a high speed, preferably the acceleration is higher than during a commutation. Analogously, the deceleration is also very fast, and the agitator stops its movement in a rather short time interval. During the strokes, the speed of the drum is substantially equal to zero, that is, the drum remains still. In a different embodiment, during the strokes the drum can also move.

Each stroke may be separated from the next stroke by a water loading step. In this case, the total amount of water in the drum is reached after a certain number of strokes, that is, between a plurality of subsequent strokes, additional water is introduced in addition to the water already present in the drum and introduced between previous strokes. Alternatively, between two different strokes, no water loading takes place and the water loading takes place only between the end of the warm up step and the beginning of the stroke steps, that is, between the last commutation of the warm up phase and the first stroke of the strokes phase, all the water is introduced in the drum in a single step.

Preferably, no parameter of operating condition of the washing machine or washer dryer is considered in the prediction step of the method of the invention if it is sensed during the first commutation of the warm up phase. The first commutation is influenced by several unpredictable factors, because the appliance is not yet in the steady state, therefore it does not bring any useful information, and for this reason the parameters detected and/or sensed during the first commutation are preferably excluded from the list of input parameters to the data driven soft sensor.

In a horizontal axis laundry machine or washer dryer, there is also a warm up step before water loading. The warm up phase also includes a plurality of commutations, as described above, with the difference that in this case the rotation of the drum is along a horizontal axis and that in an horizontal axis washing machine or washer dryer there is no agitator. Therefore, only the speed rotates and perform an acceleration followed by a deceleration.

Preferably, the same parameters are sensed during the execution of each commutation belonging to a plurality of subsequent commutations. These characteristics or parameters which are sensed are then for example averaged before they are used as inputs to the prediction algorithm.

Preferably, said step of predicting a weight of the laundry present within the laundry treatment appliance based on said plurality of parameters by means of a data-driven soft sensor takes place before the step of loading water into the drum.

It is possible to obtain a fast determination of the weight of the laundry before a washing phase starts, so that for example information to the user can be displayed quickly. This fast determination therefore preferably uses only operating parameters of the washing machine sensed during the above described commutations. This fast determination can be used to adapt settings of the selected program. Although this fast determination is obtained in a very short time interval, that is, after few minutes from the beginning of the program, it can be rather accurate, in particular if only a classification of the weight is desired.

More preferably, the step of sensing a plurality of parameters indicating operating conditions of the laundry treatment appliance during one or more commutations includes sensing the same parameters during the execution of each commutation of a plurality of commutations.

In order to improve the accuracy of the prediction, the same parameters of the same operating conditions of the appliance are obtained for a plurality of different N commutations, preferably subsequent N commutations. The input to the algorithm for the predictions are thus not the parameters as such, but for example the averaged parameters over the N commutations detected. This improves the accuracy of the prediction. Alternatively, for the parameters sensed during each commutation a prediction of the weight can be made and then a final weight prediction is made considering all the predictions as a whole, one prediction for each commutation. For example, the most frequent weight prediction can be considered as the final prediction of the algorithm.

More preferably, said prediction step based on the sensed parameters indicating operating conditions of the laundry during one or more commutations lasts less than a minute. Even more preferably, this prediction is given within 2 minutes from the start of the selected program.

As mentioned, the "fast prediction" uses only parameters relative to the operating conditions of the washing machine or washer dryer during the commutations. The commutations take place at the beginning of the selected program, before water is loaded into the washing machine. In this way, the desired operating conditions can be sensed and a quick prediction can be made.

Preferably, the horizontal axis or the vertical axis laundry machine or the laundry washer-dryer includes a motor to rotate the rotatable drum, and the step of sensing a plurality of parameters indicating operating conditions of the laundry treatment appliance during one or more commutations of the drum includes sensing a value function of a torque produced by the motor of the drum during a commutation and/or of a drum speed during a commutation and/or of a current absorbed by the motor during a commutation.

The parameters relative to the torque and to the current absorbed by the motor can be correlated one to the other so that only one of the two may be used. Further, the rotational speed of the drum is equal to the rotational speed of the agitator in a vertical axis laundry machine or washer dryer.

Many parameters of the operating conditions of the washing machine or washer dryer can be sensed during any phase of the selected program, that is during for example the commutations. In order to determine which parameters are more relevant and are therefore preferred to be used as inputs in the prediction algorithm, several methods can be used. As mentioned, because the washing machine or washer dryer does not include a dedicated processor for the prediction, preferably the amount of inputs used in the algorithm is kept rather "low". In order to determine which parameters are preferred, preferably a correlation among the different parameters is calculated.

Correlation refers to any of a broad class of statistical relationships involving dependence, though it most in common usage often refers to the extent to which two variables have a linear relationship with each other.

Correlations are useful because they can indicate a predictive relationship that can be exploited in practice.

Preferably, the Pearson correlation is calculated.

The Pearson's correlation coefficient is obtained by dividing the covariance of the two variables by the product of their standard deviations.

The population correlation coefficient $\rho_{X,Y}$ between two random variables X and Y with expected values $\mu_X$ and $\mu_Y$ and standard deviations $\sigma_X$ and $\sigma_Y$ is defined as:

$$\rho_{X,Y} = \text{corr}(X, Y) = \frac{\text{cov}(X, Y)}{\sigma_X \sigma_Y} = \frac{E[(X - \mu_X)(Y - \mu_Y)]}{\sigma_X \sigma_Y},$$

where E is the expected value operator, cov means covariance, and corr is a widely used alternative notation for the correlation coefficient.

The Pearson correlation is defined only if both of the standard deviations are finite and nonzero. The correlation cannot exceed 1 in absolute value. The correlation coefficient is symmetric: corr(X,Y)=corr(Y,X).

The Pearson correlation is +1 in the case of a perfect direct (increasing) linear relationship (correlation), −1 in the case of a perfect decreasing (inverse) linear relationship (anticorrelation), and some value between −1 and 1 in all other cases, indicating the degree of linear dependence between the variables. As it approaches zero there is less of a relationship (closer to uncorrelated). The closer the coefficient is to either −1 or 1, the stronger the correlation between the variables.

If the variables are independent, Pearson's correlation coefficient is 0, but the converse is not true because the correlation coefficient detects only linear dependencies between two variables. For example, suppose the random variable X is symmetrically distributed about zero, and $Y=X^2$. Then Y is completely determined by X, so that X and Y are perfectly dependent, but their correlation is zero; they are uncorrelated.

Another parameters selection can be performed selecting those parameters that change most depending on the different loads present in the drum.

Preferably, the laundry treatment appliance is a vertical axis laundry machine o laundry washer dryer including a rotatable drum and an agitator and, after the step of starting the selected laundry program, the method includes:
- loading water into the drum;
- performing a plurality of agitator strokes after water loading into the drum;

and the step of sensing a plurality of parameters includes:
- sensing a plurality of parameters indicating operating conditions of the laundry treatment appliance during one or more strokes.

As mentioned above, in a vertical axis washing machine or washer-dryer, after the loading of water, the agitator performs "strokes" where the agitator is rapidly accelerated and then rapidly decelerated, in order to move the laundry and wash the same. In order to improve the prediction of the weight of the laundry which can be obtained using parameters of the operating conditions of the appliance during commutations, further parameters are considered as inputs for the prediction algorithm. These parameters are an indication of the operating conditions of the washing machine or washer dryer during the execution of one or more strokes.

More preferably, the step of sensing a plurality of parameters indicating operating conditions of the laundry treatment appliance during one or more strokes includes the step of sensing the same parameters during the execution of each stroke of a plurality of strokes.

The strokes preferably are considered as independent observation and the same parameters are obtained for each stroke of the plurality. Considering the same parameters for a plurality of strokes improves the accuracy of the prediction.

More preferably, the step of sensing a plurality of parameters indicating operating conditions of the laundry treatment appliance during one or more strokes includes sensing a value function of a torque produced by the motor of the drum during a stroke and/or of an agitator and/or drum speed during a stroke and/or of a current absorbed by the motor during a stroke.

The same considerations applicable to the parameters used as inputs and sensed during commutations apply.

More preferably, the step of predicting a weight of the laundry present within the laundry treatment appliance includes the step of predicting the weight on the basis of the parameters of the operating conditions of the washing machine or washer dryer during at least a commutation and during at least a stroke.

As mentioned, as inputs to the prediction algorithm, parameters relative to operating conditions of the appliance both during a commutation and a stroke are used, and in this way a better accuracy of the prediction of the weight of the laundry is achieved.

More preferably, the method includes:
- sensing the parameters of the operative conditions of the appliance during at least a commutation;
- sensing the parameters of the operative conditions of the appliance during a plurality of strokes;
- predicting a plurality of weights of the laundry, each weight prediction being realized on the basis of the parameters of the operative conditions of the appliance during the at least a commutation and during a single stroke;
- selecting a single weight among the plurality of predicted weights as the prediction of the weight of the laundry on the basis of statistical analysis.

More preferably, the most frequent predicted weight among the plurality of predicted weights is selected as the single output weight.

Preferably, the laundry treatment appliance is a vertical axis laundry machine o laundry washer-dryer including a rotatable drum and an agitator and, after the step of starting the select program, the method includes:
- performing a plurality of commutations of the drum, each drum commutation having an acceleration portion and a deceleration portion;
- loading water into the drum;
- performing a plurality of agitator strokes after water loading into the drum;

and the step of sensing a plurality of parameters includes:
- sensing a plurality of parameters indicating operating conditions of the laundry treatment appliance during water loading.

Preferably, parameters relative to operating conditions of the appliance during water loading are used only if water loading takes place in a single steps and/or if the parameters obtained during execution of strokes do not include a water loading step therebetween, that is, all strokes which are considered (during which parameters are sensed and which are used as input in the algorithm) are executed with the same amount of water inside the drum.

Considering further parameters, such as those of the water loading step, increases the accuracy of the prediction.

More preferably, the step of sensing a plurality of parameters indicating operating conditions of the laundry treatment appliance during water loading includes sensing a value function of a torque produced by the motor of the drum during water loading and/or of a water level during water loading and/or of a current absorbed by the motor during water loading.

Preferably, the laundry treatment appliance is a laundry dryer including a rotatable drum, and the step of predicting a weight of the laundry includes determining a weight of wet laundry and a weight of dry laundry.

In a further embodiment, the laundry treatment appliance of the invention includes a dryer. In the dryer, not only a single weight prediction is performed, but preferably two weight predictions. A first weight predictions related to the weight of the wet laundry, that is, the weight of the laundry as introduced in the drum of the dryer to be dried. A further prediction is made of the dry laundry, that is, of the weight of the laundry close to the end of the drying cycle. Preferably also an estimation of the initial moisture of the laundry introduced in the drum is performed.

The two predictions are used preferably for different purposes. For example, an initial prediction of the weight of the wet laundry—which is preferably "fast"—is used to improve the drying process handling. The prediction of the weight of the dry laundry allows to set an end of cycle.

The fast estimation is preferably obtained in less than 5 minutes for improving drying process handling.

The end-cycle estimation is preferably obtained in "useful-time" for improving the end-cycle detection (more precision is required), such as 20-30 minutes before the end of the cycle.

Preferably, after the step of starting the selected laundry program, the method includes the step of blowing drying air into said drum, and the step of predicting a weight of the wet laundry is performed before the step of blowing dry air into the drum.

The "fast prediction" of the wet laundry starts before the drying cycle can begin so as preferably to modify, if necessary, some setting of the drying program selected by the user depending on the predicted weight of the laundry.

Preferably, the method includes the step of predicting a humidity of said laundry introduced in said drum based on said plurality of parameters by means of said data driven soft sensor.

Preferably, the step of sensing a plurality of parameters includes:

sensing a plurality of parameters indicating a temperature of the process air; ad/or sensing a plurality of parameters indicating a temperature of a refrigerant in a refrigerant circuit and/or of the operational condition of a compressor if said dryer includes a heat pump.

Specific parameters can be obtained by a plurality of sensors included in the dryer. For example from a plurality of sensors, obtainable signals indicate the operating conditions of several components of the appliance, like the operative conditions of the compressor, of the motor, temperature values from a temperature probe (NTC) etc. Additional signals can be obtained from the conductivity sensor. All these values can be elaborated before being sent as inputs to the algorithm of the soft sensor.

Other parameters are available as inputs, these include laboratory temperature, laboratory humidity, energy consumption, recovered water percentage, load type and load final moisture.

The selection of the preferred parameters to be used as inputs in the algorithm of the soft sensor is selected according to the specific selected embodiment, that is, looking at the correlations among the parameters and checking which parameters change most when a different load is present in the dryer.

Preferably, the step of sensing a plurality of parameters includes:

sensing a humidity of said laundry by means of a humidity sensor.

Preferably, the laundry treatment appliance is a horizontal axis washing machine or washer dryer including a rotatable drum, and the method includes:

dividing possible weights of the laundry present in the drum in a plurality of classes; and wherein the step of predicting a weight of the laundry present within the laundry treatment appliance includes:

predicting which class of said plurality a weight of laundry introduced in said drum belong to.

In a different embodiment, the prediction of the weight of the laundry is not considered as a regression problem, but as a classification problem. Considering the prediction of the weight a classification problem allows to obtain very accurate results in a very short time, that is, for example in less than a minute and even in less than 30 seconds. In this very short time interval, the weight class to which the laundry introduced in the drum belongs is very precisely identified.

More preferably, said step of predicting a weight of the laundry includes predicting a weight of the laundry using a logistic regression.

Logistic regression has been chosen for after evaluating its classification accuracy is done through an extensive set of Monte-Carlo simulations, an algorithm that allow to fairly estimate model performances without requiring a dedicated Design-of-Experiment of physical tests.

A second motivation for adopting logistic regression as classification algorithm for this application is the simple form of its solution: a linear combination that guarantees fast computation on the product.

A third reason for the adoption of logistic regression is due to the fact that the outcome of the sigmoid function as a probabilistic interpretation that can be used to apply confidence levels on the classification. Such confidence levels can therefore be exploited to discard commutations whose classification is not 'certain' and decide the overall classification of the load just based on the mode of the other commutations (choose the most represented class).

Logistic regression is a regression model where the dependent variable (DV) is categorical.

Logistic regression measures the relationship between the categorical dependent variable and one or more independent variables by estimating probabilities using a logistic function, which is the cumulative logistic distribution. Thus, it treats the same set of problems as probit regression using similar techniques, with the latter using a cumulative normal distribution curve instead. Equivalently, in the latent variable interpretations of these two methods, the first assumes a standard logistic distribution of errors and the second a standard normal distribution of errors.

Logistic regression can be seen as a special case of generalized linear model and thus analogous to linear regression. The model of logistic regression, however, is based on quite different assumptions (about the relationship between dependent and independent variables) from those of linear regression. In particular the key differences of these two models can be seen in the following two features of logistic regression. First, the conditional distribution y|x is a Bernoulli distribution rather than a Gaussian distribution, because the dependent variable is binary. Second, the predicted values are probabilities and are therefore restricted to (0,1) through the logistic distribution function because logistic regression predicts the probability of particular outcomes.

The logistic regression uses the logistic function. The logistic function is useful because it can take an input with any value from negative to positive infinity, whereas the output always takes values between zero and one and hence is interpretable as a probability. The logistic function $\sigma(t)$ is defined as follows:

$$\sigma(t) = \frac{e^t}{e^t + 1} = \frac{1}{1 + e^{-t}}$$

Let us assume that t is a linear function of a single explanatory variable x (the case where t is a linear combination of multiple explanatory variables is treated similarly). We can then express t as follows:

$$t = \beta_0 + \beta_1 x$$

And the logistic function can now be written as:

$$F(x) = \frac{1}{1 + e^{-(\beta_0 + \beta_1 x)}}$$

Note that F(x) is interpreted as the probability of the dependent variable equaling a "success" or "case" rather than a failure or non-case. It's clear that the response variables $Y_i$ are not identically distributed: $P(Y_i=1|X)$ differs from one data point $X_i$ to another, though they are independent given design matrix X and shared with parameters β. Preferably, the method of the invention includes the step of:

determining a duration of the selected laundry program or modifying a pre-set duration of the laundry program on the basis of said predicted weight of the laundry.

More preferably, if said laundry treatment appliance is a laundry dryer, determining a duration of the selected laundry program includes determining a duration of the selected laundry program on the basis of the desired end humidity in the laundry and/or of the type of fabric of the laundry.

Currently, several programs are available in the user interface to be selected and to those different programs different end-cycle time are associated, therefore in the end-cycle estimation this fact is preferably taken into account: it is possible to change the program settings to choose specific datasets to construct models for
Iron program where a higher humidity in the laundry is desired,
Not Iron programs.

Synthetic data present alternative initial moisture quantity, so they are processed apart from other humidity estimation.

The Iron is set to produce a drying cycle which finishes before all other programs. Thus, preferably different end-cycle load estimators are created, one based on the stop time of the Iron tests and the other based on the stop time of the remaining tests (preferably except the synthetic ones).

Preferably, the method of the invention includes the step of:
emitting a warning or notice signal if said predicted weight of the laundry is above a pre-set threshold.

Preferably, the method of the invention includes one or more of the following on the basis of the predicted weight:
changing a parameter of the operating conditions of a motor of the appliance;
changing a parameter of the operating conditions of movements of a drum;
changing a parameter of the operating conditions of movements of an agitator;
changing a parameter of the operating conditions of a process air fan;
changing a parameter of the operating conditions of a compressor of a heat pump;
changing a temperature of a process drying air;
changing a parameter of the operating conditions of a water heater;
changing a parameter of the operating conditions of a process air heater;
changing a parameter of the operating conditions of a condenser using water spray as condensing device;
changing a level of the water in a drum;
changing a parameter of the operating conditions of the opening and/or closing of a water valve, such as a valve sending water to a condenser using a water sprayer;
changing an amount of a treating substance and/or detergent to be introduced in a drum.

The predicted weigh of the laundry can be used for changing many different setting in the laundry treatment appliance as well as for displaying information useful for the user, such as the estimated end of the cycle or a warning alarm which requires the user attention.

According to the invention, an accurate prediction of the weight can be obtained in an easy manner and can be used in further steps of the functioning of the appliance.

BRIEF DESCRIPTION OF THE DRAWINGS

The present invention will now be described with reference to the accompanying drawings that illustrate non-limiting embodiments thereof, wherein:

FIG. 13 is a confusion matrix of an embodiment of the method of FIG. 11;

FIG. 14 is a confusion matrix of another embodiment of the method of FIG. 12;

As illustrated in FIG. 1, a vertical axis laundry washing machine 1 of the kind considered here comprises an outer casing 10 in the shape of substantially a parallelepiped. Most of a top wall of the casing 10 is occupied by a clothes loading aperture 11, wherein a lid (not shown) is hinged on along a rear side of the top wall. Further, on the top wall, a control panel 12 carrying the various control and display or indicating devices of the machine is preferably present. Within the casing 10, there are housed some compartments (not shown) intended for containing the chemical aids to be filled in for use in the washing phases of the operating cycles of the machine.

Figure 1:
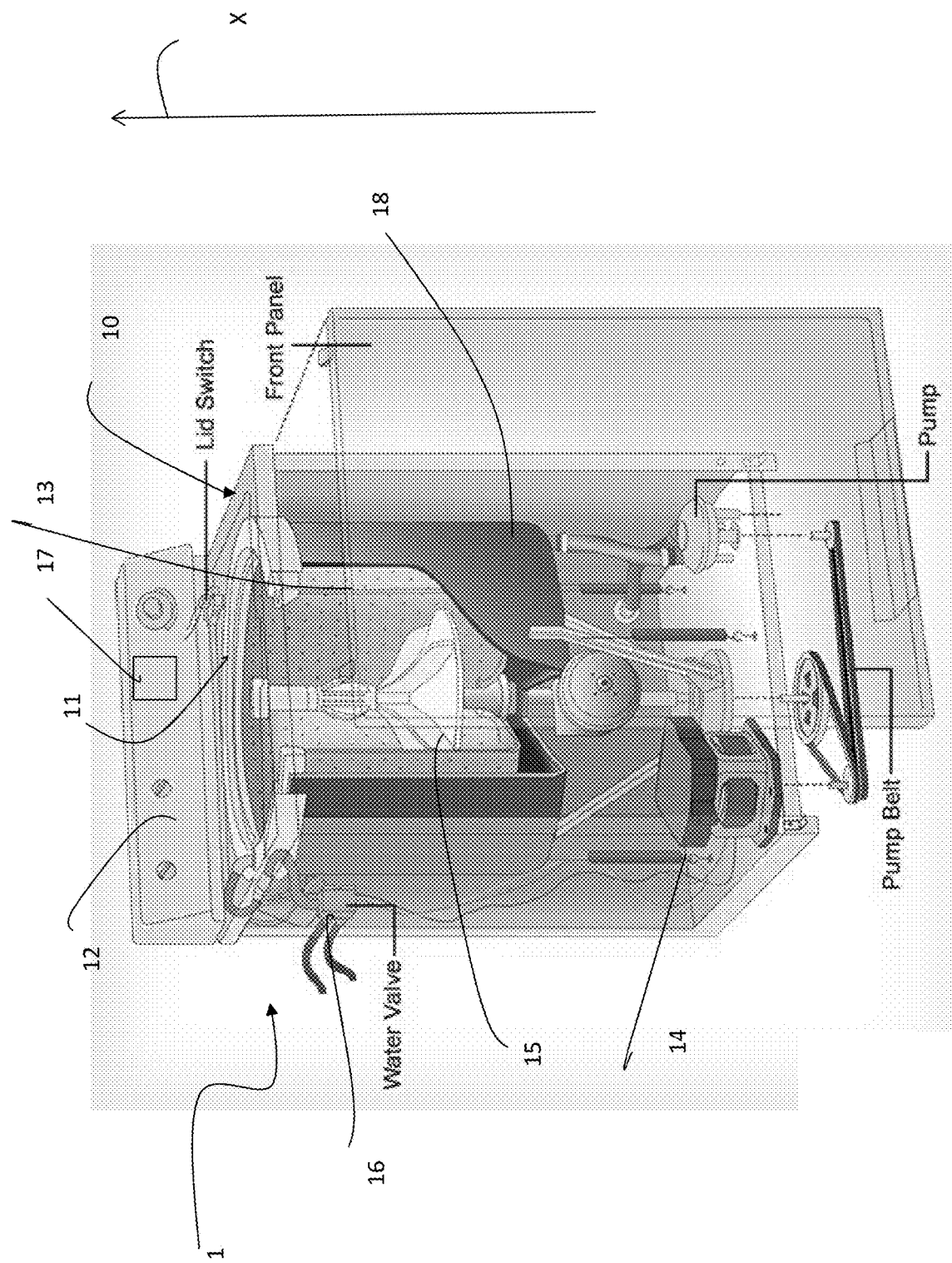
FIG. 1 is a isometric view in section of a first embodiment of the laundry treatment appliance of the invention.

The interior of the casing 10 accommodates an oscillating tub 18 which is essentially constituted by a cylindrical enclosure and two horizontal head pieces on the front and the rear side thereof, wherein said tub houses a single perforated drum 13 for loading and removing the clothes through the aperture 11. The drum 13, therefore, is of the type rotating about a vertical axis X, parallel to the height dimension of the casing 10, as driven by an electric motor 14 mounted below the tub 18.

The mechanical action to wash the clothes inside the drum 13 is given by an agitator 15 which can move the laundry inside the drum in a clockwise or counter clockwise manner. Further, also the drum 13 can be driven in rotation in a clockwise or counter clockwise manner.

Water can be loaded inside the drum 13 by means of tubes located in the upper portion of the casing 10 and the amount of water is regulated by the presence of one or more valves 16.

The washing machine 1 further includes a control unit 17, schematically depicted in FIG. 1, where a processor, such as a microcontroller, is present, to control the functioning of the washing machine and storing program cycles to be selected by a user from the control panel 12. The control unit 17 stores also a proper algorithm in order to predict a weight of the laundry introduced inside the drum 13.

Further, the washing machine includes a plurality of sensors (not visible in the drawings) apt to sense values or parameters indicating the operating conditions of the washing machine 1 during its functioning. These parameters may depend on the type of program selected by means of the control panel 17.

In order to select the prediction algorithm for the weight prediction in a data driven soft sensor stored in the control unit 17 and of the parameters to be sensed and to be given as inputs in the prediction algorithm, a first and a second dataset of test data where for a plurality of parameters sensed by sensors in the washing machine the corresponding measured value of the weight of the laundry was available have been used. This first and second dataset have been obtain in field tests on the vertical axis washing machine.

In any of the program cycles stored in the control unit, the cycle of the washing machine can be divided in a warm up phase where a plurality of commutations take place, followed by a water loading phase, further followed by a stroke phase. In the first training dataset the loading of water is performed in a "step by step" manner, that is, water is added in the drum several times in order to reach the total amount of water needed for washing, and these water loading sub-steps takes place between a plurality of subsequent strokes. In the second training dataset, the water is loaded in a single step at the end of the warm up phase and before the strokes phase starts.

The prediction of the weight of the laundry introduced in the washing machine is considered to be in this embodiment a regression problem, that is, the outcome of the prediction algorithm is a number indicating the weight of the laundry, such as a number of kilograms.

Both first and second dataset include values relating to operating conditions of the appliance during the execution of the commutations, and/or water loading and/or strokes.

Figure 2:
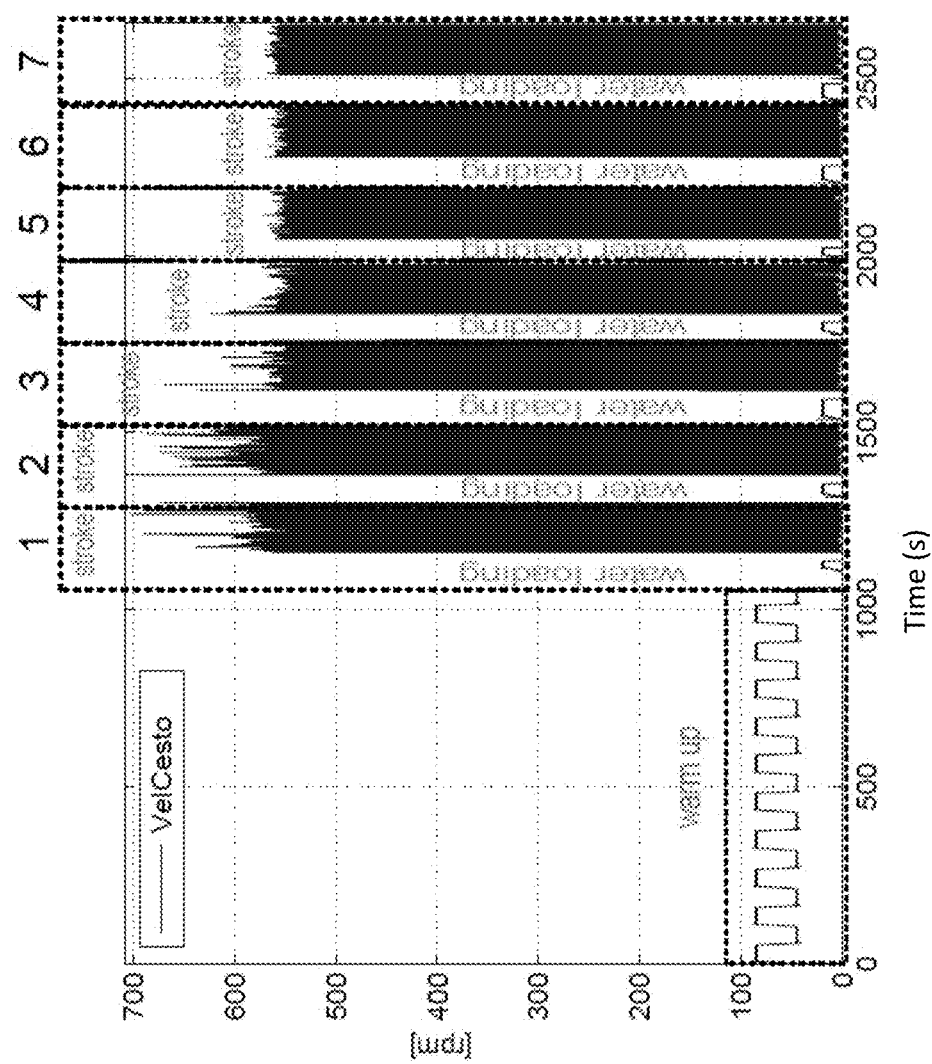
FIG. 2 is a graph showing a parameter of the operating functions of the appliance of FIG. 1.

In FIG. 2, the velocity of the agitator 13 with a 5 kg load of laundry is shown during commutations and strokes, to visualize the behaviour of the drum during these phases. In the commutations, the velocity of the agitator and the drum is the same. These depicted data are a part of the first dataset, that is, water loading takes place in a plurality of subsequent steps between different strokes.

In the first dataset, all parameters indicative of the operating conditions during the first commutation in the warm up phase and of the water loading phases are not considered as inputs for the algorithm in the data driven soft sensor.

In the first dataset, the phases of warm up and strokes are considered separately, that is, the warm up phase and the stroke phase and the parameters collected during these different phases are considered to be different events.

Many parameters of the operating conditions of the appliance during the execution of the commutations and/or strokes are available. It is therefore evaluated which parameters of the operating conditions of the appliance which are sensed during the commutations and/or during the stroke are valid proper input for the data sensor, so that only a sub-set of all available sensed parameters is used as input to the selected algorithm.

Figure 3:
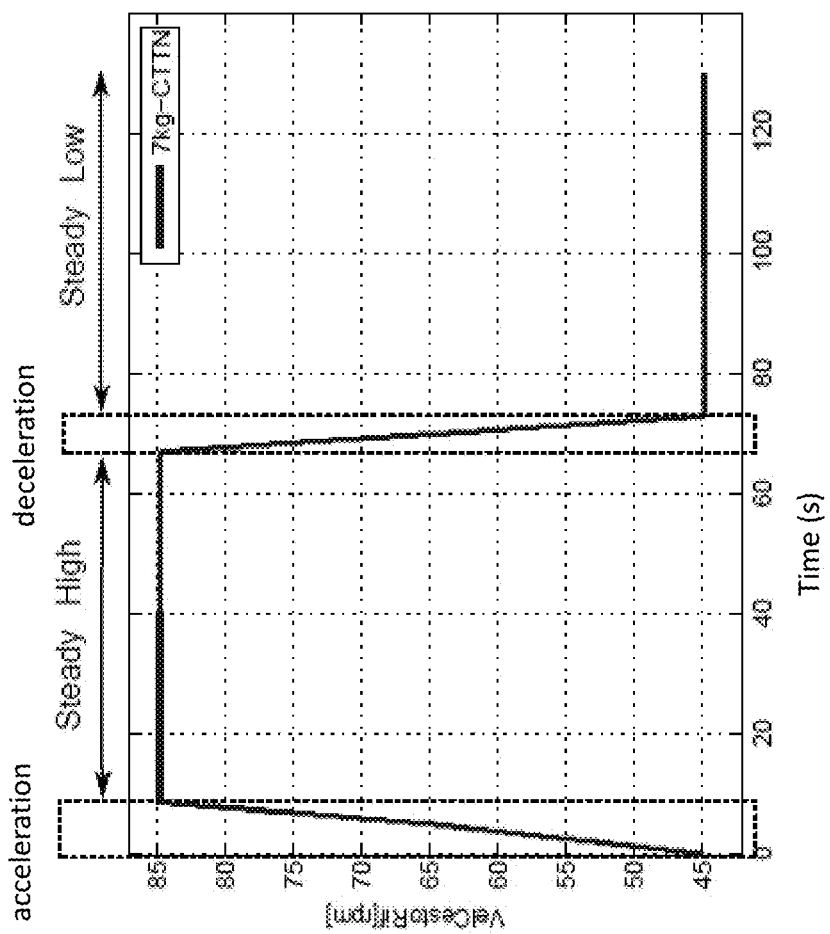
FIG. 3 is a detail of the graph of FIG. 2.

The sensed parameters of the appliance considered during the warm up phase are the following. Each commutation has been considered as being divided in an acceleration portion, where the agitator and the drum accelerates to a reference speed, a subsequent substantially constant "high" speed portion around the reference speed, in a deceleration portion where the agitator and the drum decelerates till a different reference speed is reached and a substantially constant "low" speed portion after deceleration. These portions, or regions, are identified in FIG. 3.

A first class of parameters of operating conditions of the appliance which are sensed during execution of commutations and which has been considered as possible input in the algorithm is a class of parameters relative to the torque of the motor during a commutation:

1) WU Time: Duration of the commutation;
2) WU Max Peak Drum-Speed Maximum speed during commutation.
3) WU OverShoot DrumSpeed Acc Difference between the maximum velocity and the reference velocity, in the acceleration interval.
4) WU OverShoot DrumSpeed Acc Time Time interval needed to reach the maximum velocity from the beginning of the commutation.
5) WU Min Peak Drum-Speed Minimum value of the speed in the deceleration phase.
6) WU OverShoot DrumSpeed Dec Difference between the minimum speed and the reference speed in the deceleration region.
7) WU OverShoot DrumSpeed Dec Time Time interval needed to reach the minimum speed from the beginning of the deceleration region.
8) WU Crossing Drum-Speed Acc Time Time interval after which the speed exceeds for the first time the reference speed in the acceleration region.
9) WU Crossing Drum-Speed Dec Time Time interval after which the speed lowers for the first time, the value of the reference speed from the beginning of the deceleration region.
10) WU Settling In Period SteadyHigh Time to reach the steady state at 1% with respect to the reference speed, in the constant speed region after the acceleration region.
11) WU Settling In Period SteadyLow Time within which the steady state at 1% with respect to the reference speed is reached, in the constant speed region from the beginning of the constant region after the acceleration region.
12) WU Crossing To Settling SteadyHigh Time Time interval between the first time the reference speed has been reached and the steady state point at 1%, in the constant region after the acceleration region.
13) WU Crossing To Settling SteadyLow Time Time interval between the first time the reference speed has been reached and the steady state point at 1%, in the constant region after the deceleration region.

14) WU Integral Drum-Torque Acc Sum of the torque values, in absolute value, till the maximum speed values has been reached, in the acceleration region.
15) WU Integral Drum-Torque Dec Sum of the torque values, in absolute value, till the maximum speed value has been reached, in the acceleration region.
16) WU Max High DrumTorque Maximum value of the torque, in absolute value, in the time interval including the acceleration region and the high steady region after acceleration.
17) WU Max Low Drum-Torque Maximum value of the torque, in absolute value, in the time interval including the deceleration region and the low steady region after deceleration.
18) WU Mean Acc DrumTorque Mean value of the torque, in absolute value, till the minimum value subsequent to WU MaxHighDrumTorque has been reached.
19) WU Mean SteadyHigh DrumTorque Mean value of the torque, in absolute value, from the minimum value subsequent to WU MaxHighDrumTorque till the constant high steady region after acceleration has been reached.
20) WU Mean Dec DrumTorque Mean value of the torque, in absolute value, till the minimum value subsequent to WU MaxLowDrumTorque has been reached.
21) WU Mean SteadyLow DrumTorque Mean value of the torque, in absolute value, from the minimum value subsequent to WU MaxLowDrumTorque till the constant low steady region after deceleration has been reached.

Regarding the strokes, two different classes of sensed parameters of the operating conditions of the appliance during the execution of a stroke have been considered: the first class is relative to the velocity of the agitator during each stroke and the second one is relative to the torque of the motor during a stroke.

The first class includes (Drum Speed indicates the speed of the agitator and not of the drum):
1) S PeriodTime Duration of the stroke.
2) S Max DrumSpeed Maximum value of the speed (of the agitator).
3) S Max DrumSpeed Time Time interval within which the speed reaches its maximum value.
4) S Crossing DrumSpeed Time Time interval after which the speed exceeds for the first time the reference speed.
5) S NumOut High DrumSpeed number of times in which the speed has a value above 5% the reference speed.
6) S NumOut Low DrumSpeed number of times in which the speed has a value below 5% the reference speed.
7) S Settling In Period DrumSpeed Time interval after which the speed does not vary of more than ±5% with respect of the reference speed, in the time interval starting from the first moment in which the reference speed has been reached til the last moment the reference speed has been reached.
8) S Mean DrumSpeed Mean value of the speed.
9) S Variance DrumSpeed Value of the variance of the speed.

The second class includes:
10) S Max DrumTorque Maximum value of the torque.
11) S Max DrumTorque Time Time interval within which the speed reaches its maximum value.
12) S Mean Power Mean value of the scalar product between speed and torque for the whole duration of the stroke.
13) S Integral Power Sum of the absolute values of the scalar products of speed and torque for the whole duration of the stroke.
14) S Mean DrumTorque Mean of the absolute value of the torque for the whole duration of the stroke.
15) S Var DrumTorque Variance of the mean absolute value of the torque for the whole duration of the stroke.
16) S Integral Torque Sum of the absolute value of the torque for the whole duration of the stroke.
17) S STD Integral Torque Standard deviation of the torque.
18) S DrumTorque PeakTime Time interval needed to reach the maximum value of the torque.
19) S Mean DrumTorqueBefore Max Mean value of the torque before reaching the maximum.
20) S Mean DrumTorqueAfter Max Mean value of the torque after having reached the maximum.
21) S Interrupted Stroke Logical variable indicating whether the series of strokes has been interrupted.

In order to determine whether all the parameters listed above are equally relevant in the prediction of the weight of the laundry and/or whether some of them can be disregarded, a Pearson correlation index has been calculated. In addition to this correlation index, which allows to determine which parameters are strongly correlated to each other among those listed, an analysis of the parameters to determine which ones have a more predominant difference among different load classes has been performed.

From these two analyses, in the present embodiment of the invention, the following parameters have been considered as a proper input for the soft sensor in order to obtain a good prediction of the weight of the laundry:
  WU OverShootDrumSpeedAcc mean
  WU OverShootDrumSpeedDec mean
  WU MeanDecDrumTorque mean
  WU MaxDecDrumTorque mean
  SET 1
in the warm up phase (i.e. relating to the commutations) and
  S MeanPower
  S MeanDrumTorque
  S IntegralDrumTorque
  S IntegralPower
  S MeanDrumTorqueAfterPeak
  SET 2
for each stroke.

After having trained the algorithm using the first dataset above mentioned, which in the present case a linear algorithm has been selected, and more specifically both a LASSO and ridge regressions algorithms have been used, a Monte Carlo cross validation of the prediction of the weight of the laundry has been performed.

Figure 4:
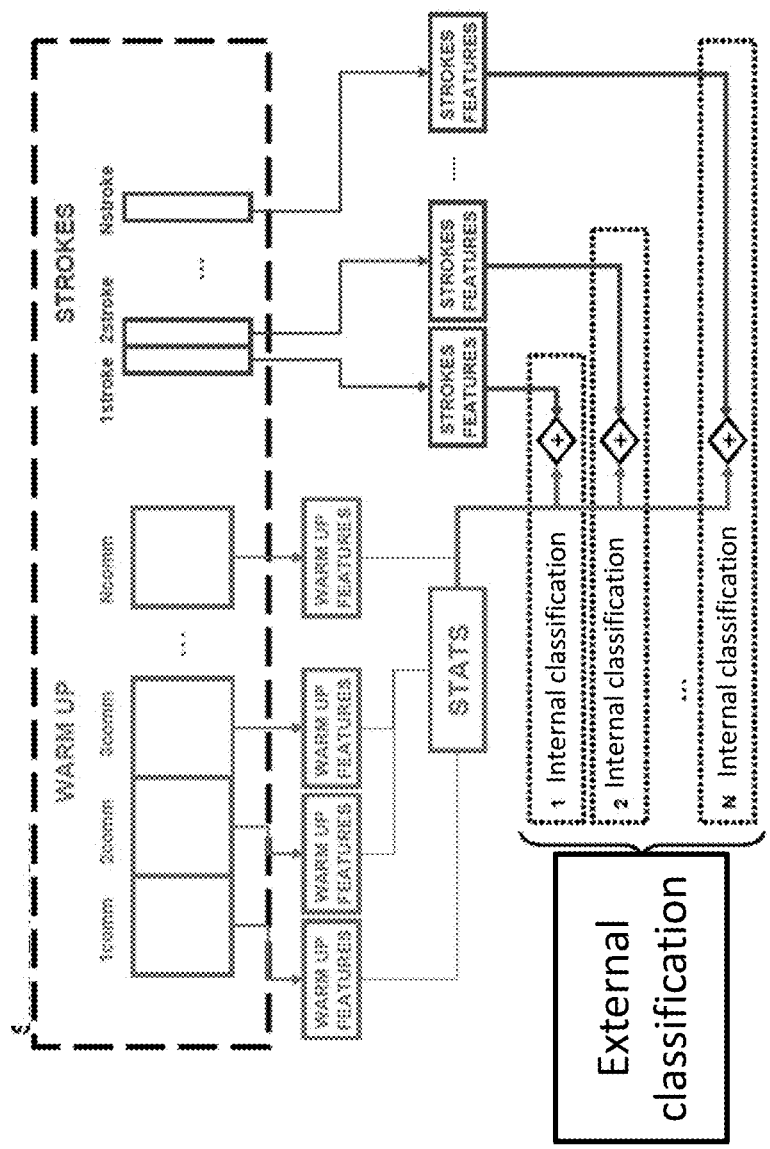
FIG. 4 is a schematic representation of one embodiment of the method of the invention.

Two types of weight predictions have been made. A first weight prediction is a "fast weight prediction" performed as soon as the appliance has been switched on and the laundry program has been selected. This fast prediction uses only parameters relative to the commutations, that is only parameters relative to the operating conditions during the warm up phase. It has been found that this prediction can give a "cross grained prediction" of the weight of the laundry rather accurate if an error of 1 or 2 kilograms in the total weight is accepted, in a very short time interval. The second weight prediction takes into account also the parameters relative to the operating conditions of the appliance during the strokes. The second weight prediction method according to the invention is depicted in FIG. 4.

In the fast prediction method, first the parameters relative of the operating condition of the laundry machine 1 during the commutations are collected. The same parameters during each commutation are sensed. The parameters preferably used are the four parameters as listed above in SET 1. Then some statistical variables are calculated on the parameters sensed, that is, the mean value, the variance, the maximum and the minimum of the parameters are obtained in order to have a single value for the same parameters obtained for the plurality of commutations. For example, 3 different commutations are taken into account and an average of the same parameters obtained for the 3 commutations are obtained.

These averages are then used as input of the prediction algorithm in order to obtain a fast prediction of the weight of the laundry.

In the "slower" weight prediction, in addition to what has been calculated in the fast prediction method, additional parameters are taken into account. The parameters of the operating conditions of the appliance during each stroke of a plurality is calculated, for example 47 consecutive strokes; the selected parameters are those above listed in the selected sub-set SET 2. The parameters of each stroke are used in the selected prediction algorithm to have a preliminary prediction of the weight of the laundry, and the prediction is performed by the linear algorithm (LASSO or ridge regression) using as inputs the parameters sensed during a specific stroke and the average of the parameters of the operating conditions during the warm up phase. A plurality of weight predictions is thus obtained (in FIG. 4 they are called internal classification), equal to the number of strokes considered. As a final prediction of the weight of the laundry, the most represented value is used (in FIG. 4 this is called external classification).

Indeed, in this slower prediction method, after having trained the algorithm with the results of the first dataset, the obtained predictions are more accurate that the prediction obtainable in the "fast weight prediction".

The second dataset used to train the prediction algorithm includes also values relative to the water loading phase which is a single phase between the warm up phase and the stroke phase. Further, in addition to the parameters relative to the torque and the speed, further parameters have been sensed, which are relative to the amount of water inside the drum, values of the selected program by the user and values of timers present in the appliance.

The following parameters relative to the operating conditions of the washing machine 1 during water loading have been sensed according to the second dataset in addition to those in the first dataset:

1) WL Torque mean torque.
2) WL LoadingTime Time interval during which the level of the water changes from zero to its maximum value.
3) WL EvWashTime Time of water loading with reference to the open time of the valve.
4) WL IntegralWater Sum of the values of the level of water during the whole duration of the water loading step.

The following parameters have been sensed in addition to those outlined above with reference to the first dataset with respect to the operating conditions of the washing machine during the strokes:

1) S IsCrossing Logical variable that indicate whether the real speed reaches the reference speed before the end of the stroke.
2) S IsSettling Logical variable which indicates whether the real speed is around 5% of the reference speed before the end of the stroke.
3) SS IntegralWater Sum of the value of the level of water in the drum during the whole series of strokes.
4) SS NumLoadWater Time interval of possible water addition during the strokes.

The parameters to be used as input in the algorithm of the soft sensor are, with reference to the commutations in the warm up phase, the same as in the first dataset (SET 1). Regarding the strokes, in addition to the parameters indicated in the first dataset SET 2, many additional variables relative to the torque or speed can be considered, such as:

(a) WU MeanDecDrumTorque mean.
(b) WU MeanAccDrumTorque mean.
(c) WU MaxAccDrumTorque mean.
(d) WU MaxDecDrumTorque mean.
(e) WU IntegralDrumTorqueAcc mean.
(f) WU OverShootDrumSpeedDec mean.
(g) WU OverShootDrumSpeedAcc mean.
(h) SS MeanDrumSpeed.
(i) SS MaxDrumSpeedTime.
(j) SS VarianceDrumSpeed.
(k) SS IntegralDrumTorque.
(l) SS IntegralPower.
(m) SS MeanDrumTorque.
(n) SS MeanDrumTorqueAfterPeak.
(o) SS MeanPower.
SET 3

Regarding water loading the most relevant parameter is WL EvWashTime.

The same correlation techniques described above to determine the preferred parameters to be sensed and used as input in the prediction algorithm have been used in order to reduce the parameters to be used as input to the algorithm to the lists above given.

From now on, two diagrams will be specifically used in order to introduce the results: confusion matrix and prediction error histogram. In the field of machine learning, a confusion matrix, also known as a confusion, is a specific table layout that allows visualization of the performance of an algorithm, typically a supervised learning one.

Each column of the matrix represents the instances in a predicted class while each row represents the instances in an actual (real) class (or vice-versa). The name stems from the fact that it makes it easy to see if the system is confusing two classes (i.e. commonly mislabelling one as another). In the main diagonal of the confusion matrix there is the exact match between predicted and real classes in percentage while other values represent the Classification Error (CE), i.e. the mismatch between predicted and real classes.

In order to give a performance indicator on predictions realized, an index called Classification Rate CR will be provided with the corresponding confusion matrix; CR has been computed as $$CR=[(\text{total matches})*100]/(\text{total comparisons})$$

where terms used are self-explaining.

Two types of weight predictions have been made also using the training with the second dataset. A first weight prediction is a "fast weight prediction" performed as soon as the appliance has been switched on and the laundry program has been selected. The fast weight prediction preferably gives a prediction within 2 minutes from the beginning of the selected program in the machine. This fast prediction uses only parameters relative to the operative conditions of the appliance during commutations. Two types of fast prediction have been performed, as depicted in FIGS. 5 and 6.

Figure 5:
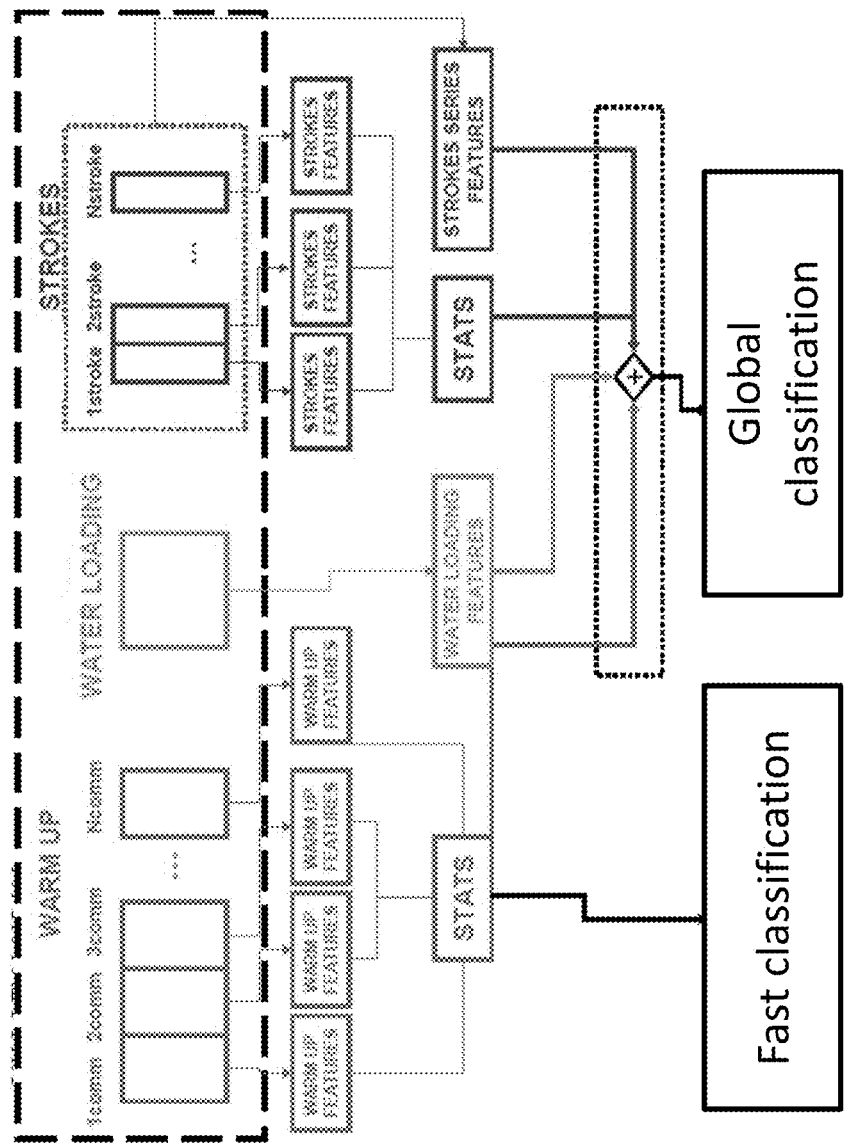
FIG. 5 is a schematic representation of a further embodiment of the method of the invention.

In FIG. 5, where the fast prediction is only a portion of the depicted method, the fast prediction takes into account only the results of parameters collected during the commutations. First, the parameters relative of the operating condition of the laundry machine 1 during the commutations are collected. The same parameters during each commutation are sensed. The parameters preferably used are the four of SET 1 as listed above. Then some statistical variables are calculated on the parameters sensed: the mean value, the variance, the maximum and the minimum of the parameters is obtained. For example, the same parameters in 3 different commutations are taken into account. At least one among: the mean value, the variance, the maximum and the minimum of each parameters is an input to the soft sensor algorithm.

Figure 6:
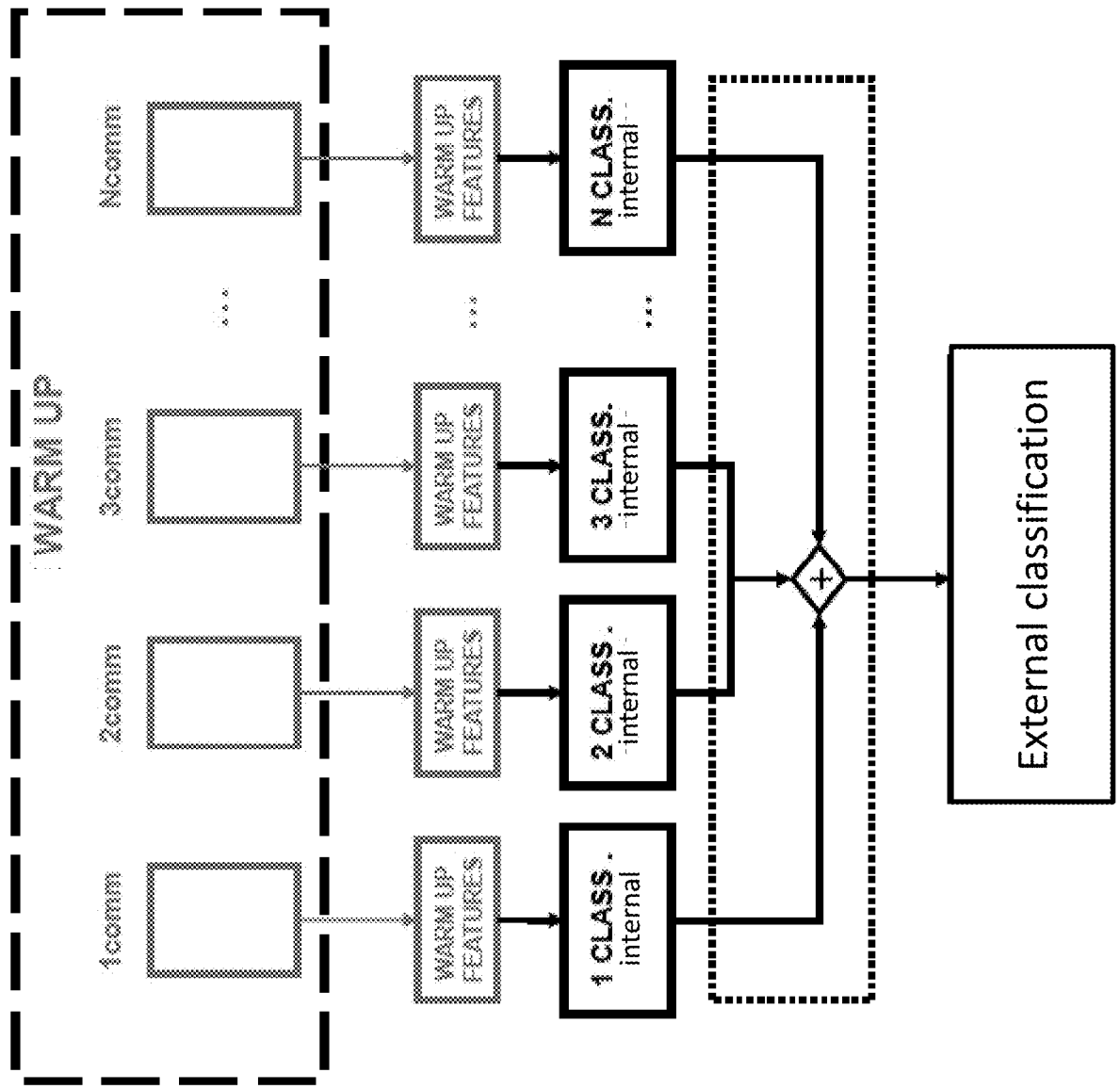
FIG. 6 is a schematic representation of a further embodiment of the method of the invention.

Alternatively, in an additional embodiment of the fast prediction, for the parameters sensed during each commutation, a calculation of the weight is obtained, as depicted in FIG. 6. Therefore, a number of weight predictions equal to the number of commutations considered is calculated (called in FIG. 6 internal classification). As a final prediction of the weight of the laundry, the most represented value is used (called in FIG. 6 external classification). It has been found that this prediction can give a "cross grained prediction" of the weight of the laundry rather accurate if an error of 1 or 2 kilograms in the total weight is accepted.

The second weight prediction of this embodiment takes into account also the parameters relative to operating conditions of the appliance during the strokes and the water loading. This "slower" weight prediction preferably gives a prediction of the weight of the laundry within 5/6 minutes from the beginning of the selected program in the machine. The second weight prediction method according to the invention is depicted in FIG. 5. In this method, first the parameters relative of the operating condition of the laundry machine 1 during the commutations are collected. The same parameters during each commutation are sensed (SET 1). The parameters preferably used are 4 as listed above. Then some statistical variables are calculated on the parameters sensed: the mean value, the variance, the maximum and the minimum of the parameters is obtained. For example, the same parameters during 3 different commutations are taken into account.

Further, the parameters of the operating conditions of the appliance during water loading (which is a single phase) are sensed.

Further, the parameters of the operating conditions of the appliance during each stroke of a plurality is calculated, for example 47 consecutive strokes; the selected parameters are those above listed (SET 2 plus additional parameters of SET 3). The parameters of the series of strokes are then averaged and their mean values are obtained. Further, parameters relative to the overall series of strokes are determined as well. The parameters of the operative conditions of the appliance during water loading, the averaged parameters of the operative conditions of the appliance during the commutations and the averaged parameters of the operative conditions of the appliance during strokes are then used as inputs to a linear algorithm (LASSO or ridge regression).

A very accurate prediction of the weight of the laundry is obtained with this model. Indeed, after having trained the algorithm with the results of the second dataset, the obtained predictions are more accurate that the prediction obtainable with the model trained on the first dataset.

Figure 7:
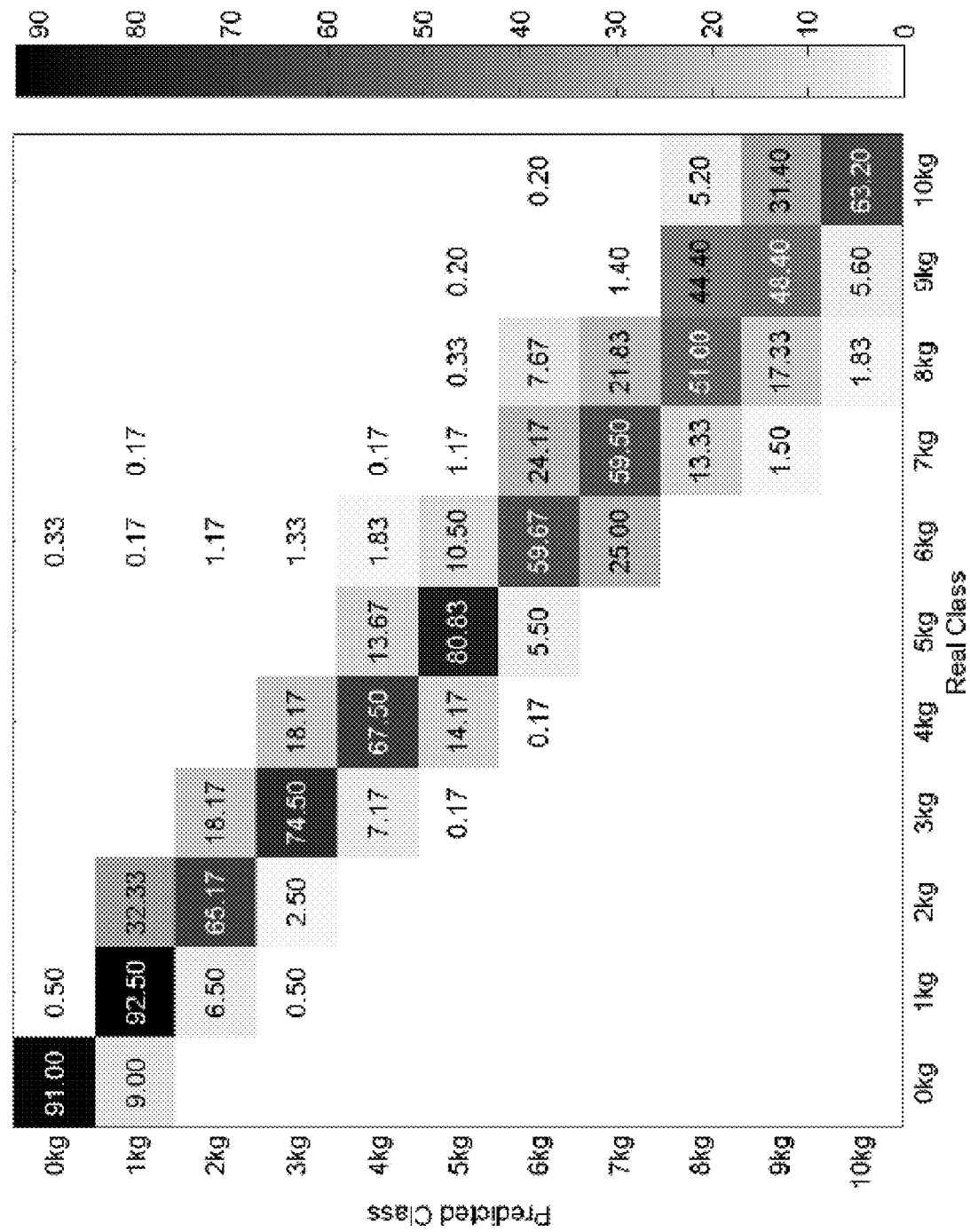
FIG. 7 is a confusion matrix of a Ridge Regression of the method of FIG. 6.
Figure 8:
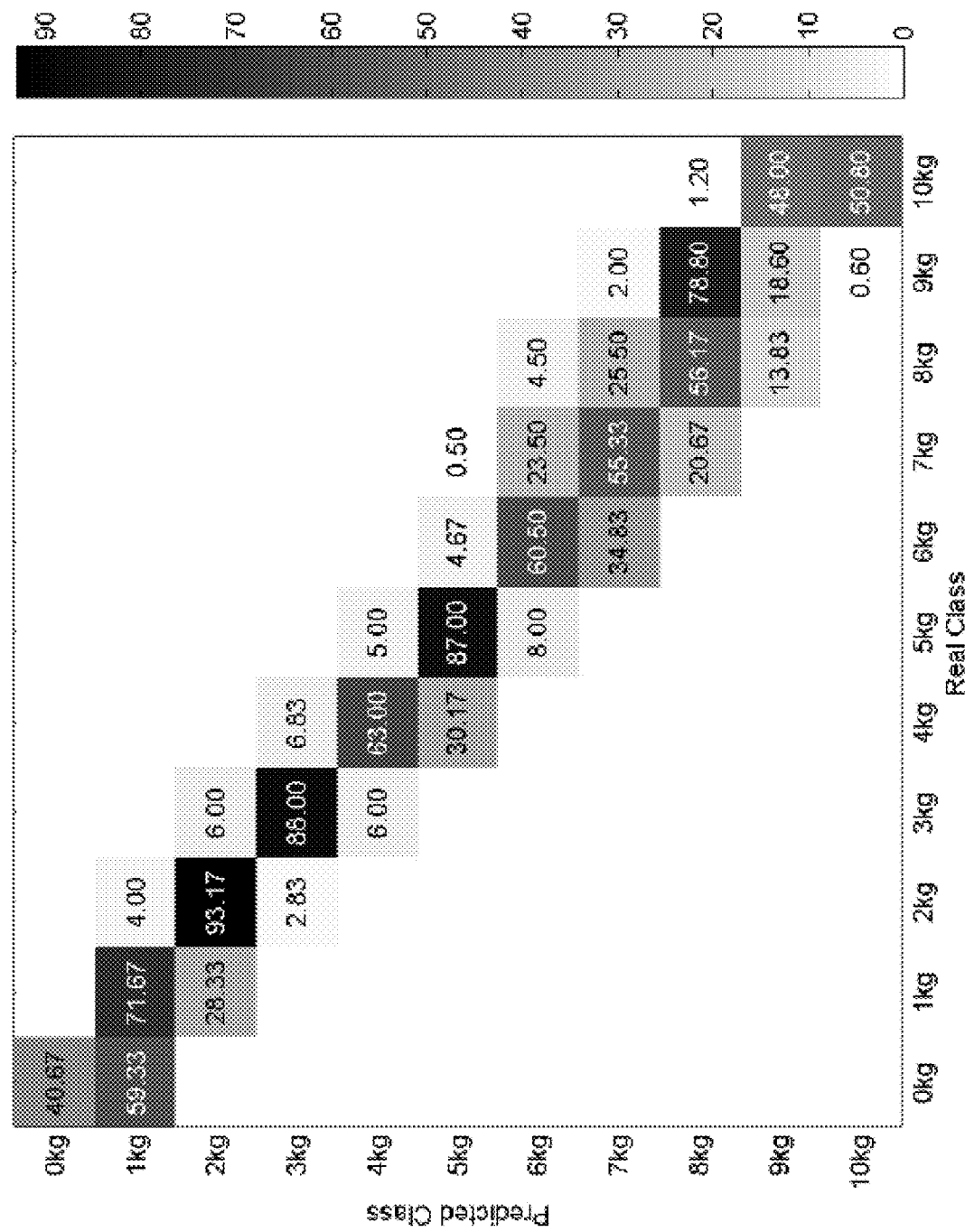
FIG. 8 is a confusion matrix of a Lasso Regression of the method of FIG. 6.
Figure 9:
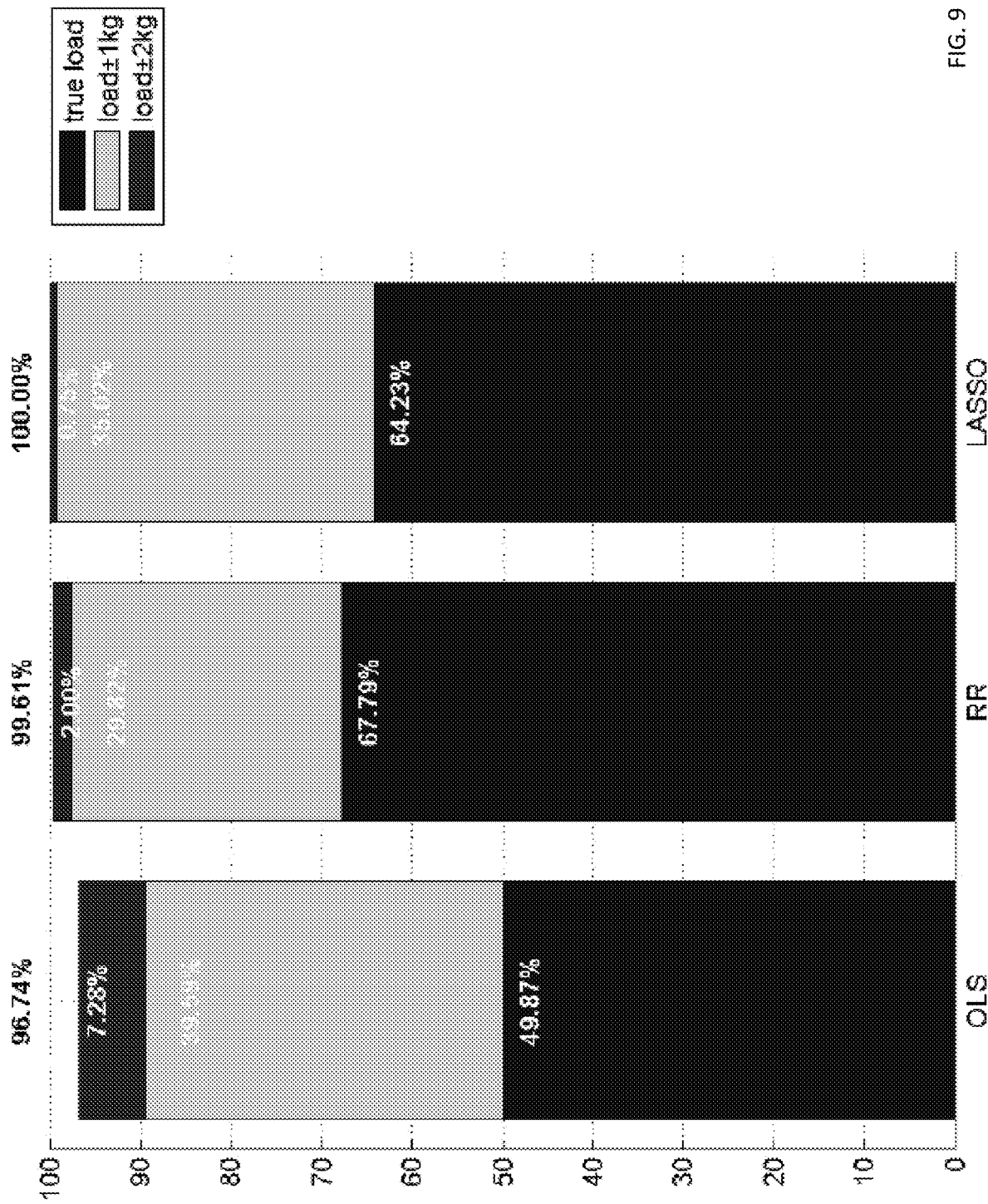
FIG. 9 is a classification rate histogram of the predictions of FIGS. 7 and 8.

In FIGS. 7 and 8, confusions matrices where in the method of FIG. 6 the Ridge Regression and LASSO regression are used, respectively, are shown according to the above mentioned method which takes into account parameters of the operating conditions of the appliance during warm up, water loading and strokes. In the ridge regression, all classes below 6 kg are correctly predicted with a percentage above 65%, while this percentage decreases considering heavier loads. Good predictions are obtained with LASSO regression as well. In FIG. 9, a classification rate of the weight of the laundry previsions based on the above written method is shown, where—in addition to the LASSO regression and Ridge Regression—results obtained by a OLS (Ordinary least squares) regression are shown as well.

Figure 10:
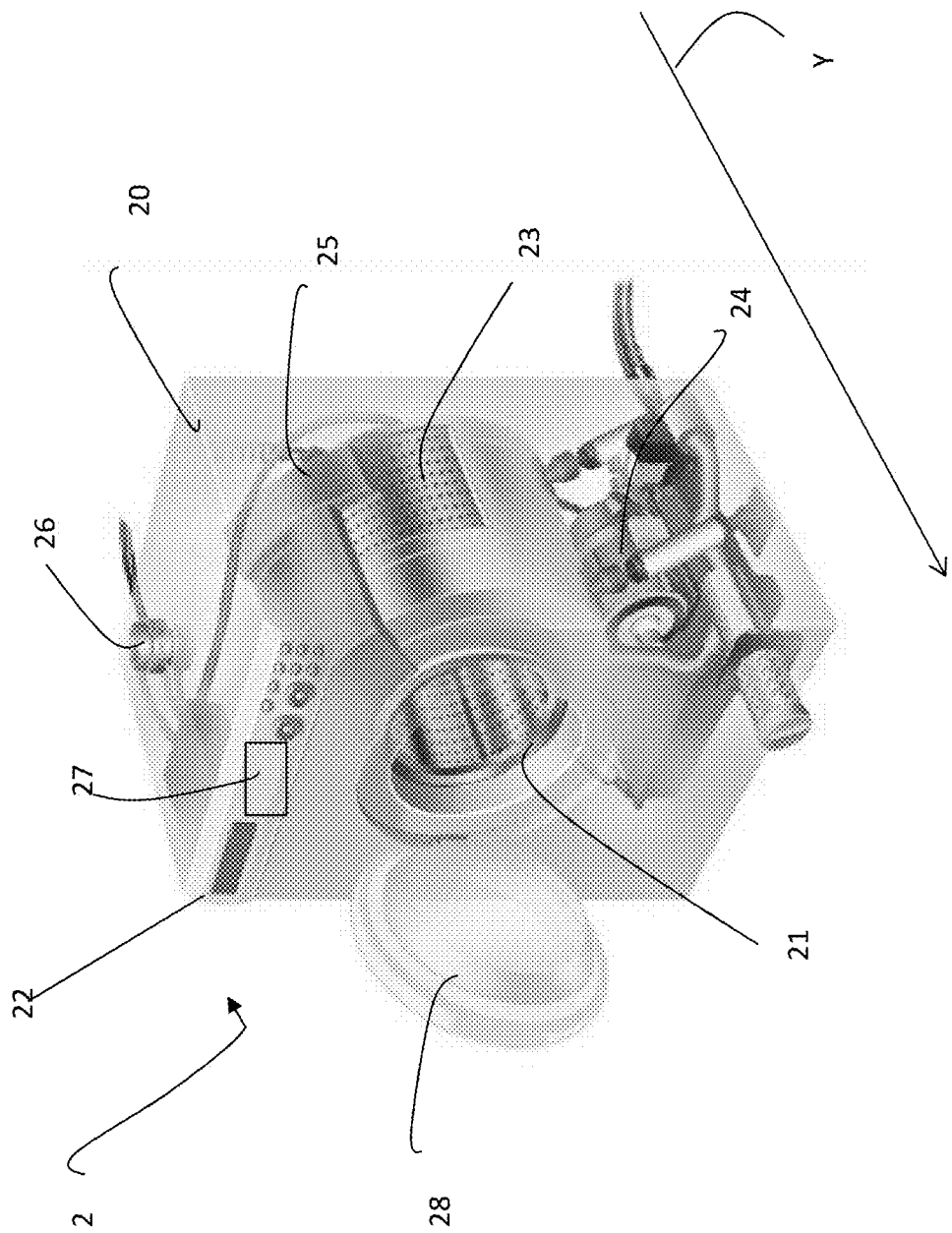
FIG. 10 is a isometric view in section of a second embodiment of the laundry treatment appliance of the invention.

In a second embodiment of the invention, the laundry treatment appliance is a horizontal axis washing machine depicted in FIG. 10.

A horizontal axis laundry washing machine 2 comprises an outer casing 20 in the shape of substantially a parallelepiped. Most of a front wall of the casing 20 is occupied by a clothes loading aperture 21, which is openable and closable by a door 28 which is hinged on the front wall. A control panel 22 carrying the various control and display or indicating devices of the machine is preferably positioned in an upper portion of the front wall. Within the casing 20, there are housed some compartments (not shown) intended for containing the chemical aids to be filled in for use in the washing phases of the operating cycles of the machine.

The interior of the casing 20 accommodates a tub 25 which is essentially constituted by a cylindrical enclosure and two vertical head pieces on the front and the rear side thereof, wherein said tub houses a single perforated drum 23 for loading and removing the clothes through the aperture 21. The drum 23, therefore, is of the type rotating about a horizontal axis Y, parallel to the width dimension of the casing 20, as driven by an electric motor 24 mounted below the tub 25.

The mechanical action to wash the clothes inside the drum 23 is given the combined rotation of the drum and the effect of gravity. The drum 23 can rotate in a clockwise or counter clockwise manner.

Water can be loaded inside the drum 23 by means of tubes and the amount of water is regulated by the presence of one or more valves 26.

The washing machine 2 further includes a control unit 27, schematically depicted in FIG. 10, where a processor, such as a microcontroller, is present, to control the functioning of the washing machine and storing program cycles to be selected by a user from the control panel 22. The control unit 27 stores also a proper algorithm in order to predict a weight of the laundry introduced inside the drum 23.

Further, the washing machine includes a plurality of sensors (not visible in the drawings) apt to sense values or parameters indicating the operating conditions of the washing machine 2 during its functioning.

In order to select the prediction algorithm for the prediction in a data driven soft sensor stored in the control unit 27 and of the parameters to be sensed and to be given as inputs in the prediction algorithm, a third dataset of data available where a plurality of parameters that can be sensed by sensors in the washing machine and the corresponding measured value of the weight of the laundry have been used. This third dataset has been obtain in field tests on the washing machine.

Figure 11:
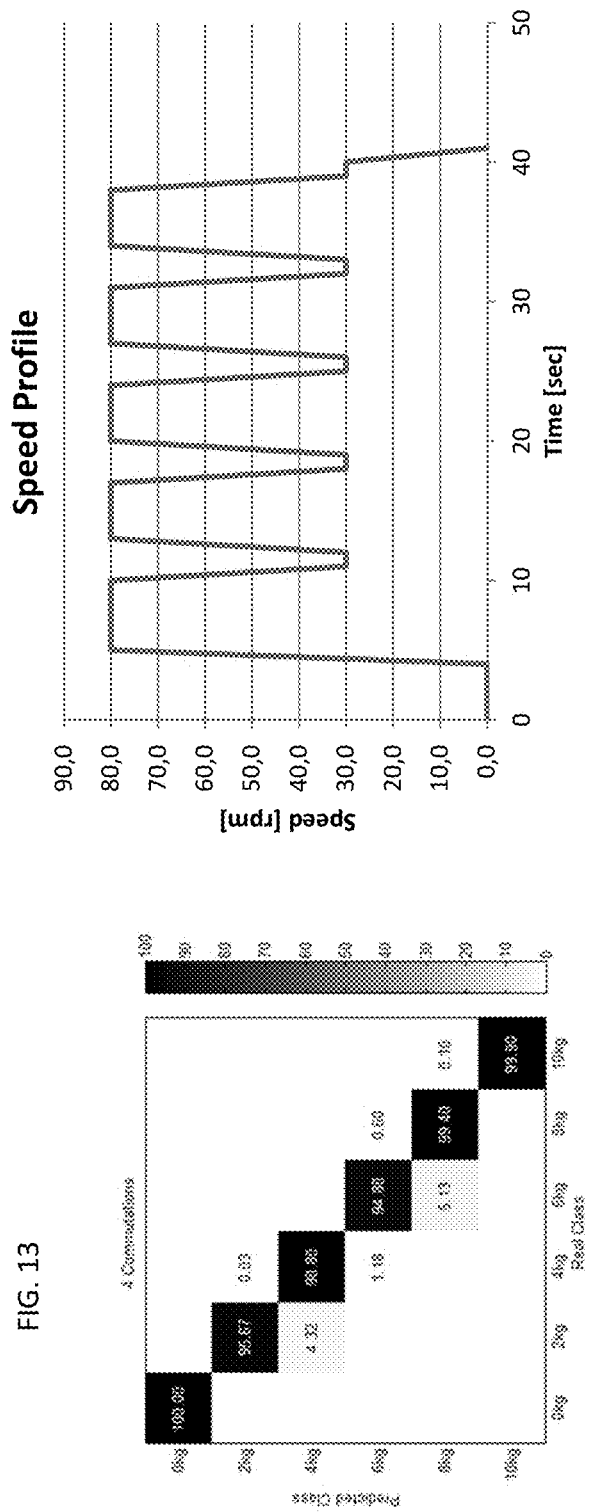
FIG. 11 is a graph showing a parameter of the operating functions of the appliance of FIG. 10.

In any of the program cycles stored in the control unit, the cycle of the washing machine begins with a plurality of commutations before water loading. The commutations are, as detailed in the first embodiment of the vertical axis laundry machine, movements of the drum including an acceleration region and a deceleration region. The commutations may take place after a drain pump has been activated to remove remaining water in the tub. These commutations differ from the commutations in a vertical axis laundry machine because the rotations of the drum are along a horizontal axis and an agitator is not present. However, the definition of the commutation, having an acceleration region, a substantially constant region and a deceleration region remain the same and the visualization of such a commutation is as shown in FIG. 11. In this case, being no agitator present, the velocity of the drum is depicted in the figure.

The prediction of the weight of the laundry introduced in the washing machine is considered to be a classification problem, that is, the outcome of the prediction algorithm is not a number, e.g., the weight of the laundry for example in kilograms, but it is a value which indicates to which class among a plurality of predefined classes, the weight of the laundry belong. For example, 6 load classes have been identified and preselected, the first class starts from a load equal to 0 kg and the last class reaches a maximum load of 10 kilograms. The classes are separated by a weight of 2 kilograms each (e.g. first class indicates a load of 0 kg, the second of 2 kg, and so on till the last class which indicates a load of 10 kg).

Further, only a fast determination is considered in this embodiment, which is a determination of the weight of the laundry that takes less than a minute to be performed, preferably less than 30 seconds. The prediction of the weight of the laundry starts as soon as the selected program has been selected and begun, and a proper number of commutations has taken place.

As in the previous embodiment, an algorithm has been selected, in this case a Logistic regression, which has been trained with the third dataset which has been provided. The third dataset includes field test of the horizontal axis washing machine.

The cross validation of the model has been made using a Monte Carlo method.

The parameters of the operating conditions of the washing machine considered to be input of the algorithm are parameters of the operating conditions of the appliance during the commutations of the drum only, so that a fast prediction can be made.

The selected parameters of the operating conditions of the appliance 2 during the commutations which are selected to be the inputs of the algorithm are the following:

Torque_Int: torque integral calculated during ramp up minus the torque average calculated at following highest reached speed (80 rpm)

$$\text{Torque\_int} = \left[\left(\sum_{i=1}^{N} T_i\right) - u\right] \cdot \Delta t;$$

where N is the number of torque samples during acceleration, $T_i$ is the torque value at instant i, u is the average torque calculated at following highest reached speed (80 rpm) step, $\Delta_t$ is the sample time.

Sample: number of samples used during ramp up for torque integral calculation (N)

Energy: mechanical power integral (integral of torque minus the torque average calculated at first 80 rpm step*speed) calculated during ramp up $$\text{Energy} = \left[\sum_{i=1}^{N} (T_i - u) \cdot \omega_i\right] \cdot \Delta t;$$

where N is the number of torque samples during acceleration, $T_i$ is the torque value at instant i, u is the average torque calculated at first 80 rpm step, $\omega_i$ is the drum speed at instant i, $\Delta_t$ is the sample time.

Torque_diff: absolute value of difference between Torque_Int of each commutation and the average Torque_Int value of the 4 commutations $$\text{Torque\_diff}_1 = \text{Torque\_int}_1 - \left(\sum_{i=1}^{4} \text{Torque\_int}_i\right);$$

The parameters sensed during 4 subsequent commutations have preferably been used.

The chosen algorithm is a Logistic Regression. It belongs to the class of Generalized Linear Models, a generalization of ordinary linear regression that allows predictions to have an error distribution models other than a normal distribution; this is achieved by exploiting a sigmoid function upon a linear combination of the input data x.

Figure 12:
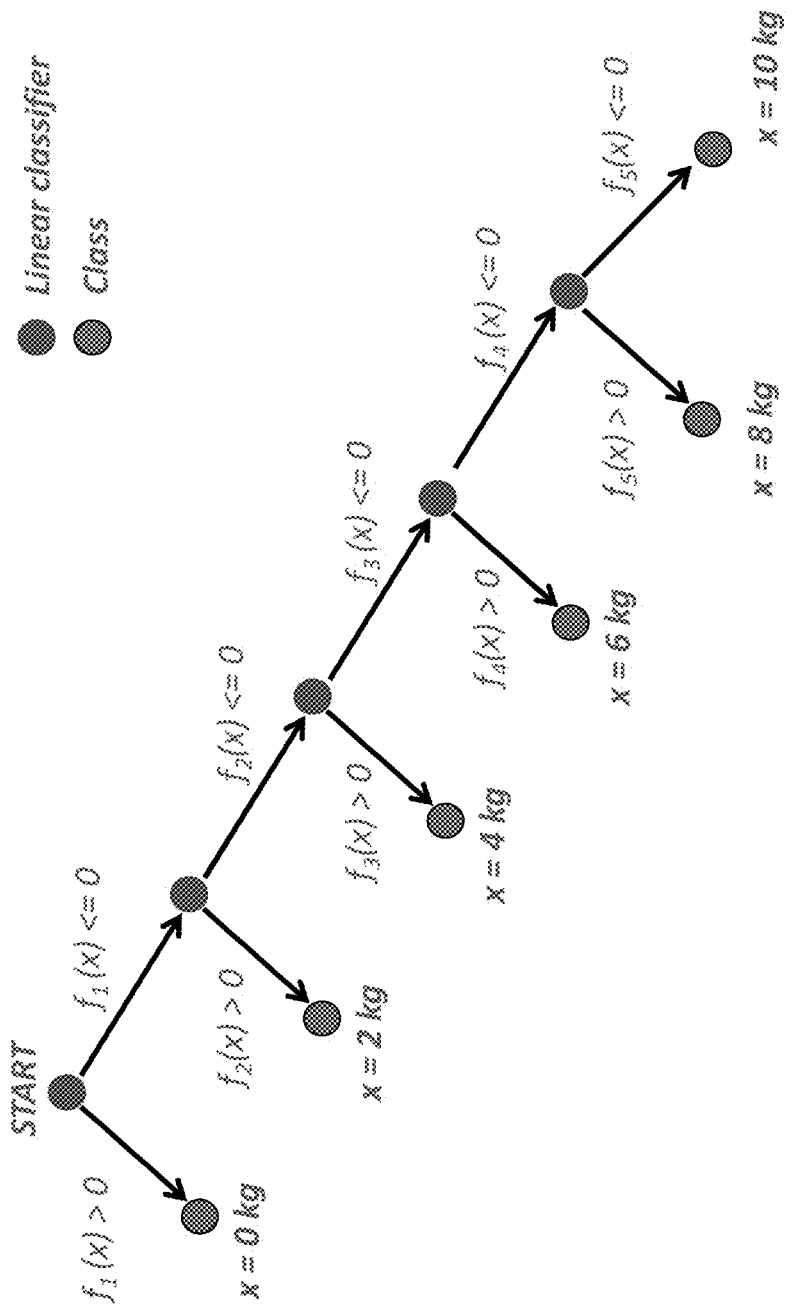
FIG. 12 is a schematic representation of a further embodiment of the method of the invention.

In FIG. 12 a schematic representation of the method according to the present embodiment in order to predict the classification of the weight of the laundry in the horizontal axis washing machine is depicted.

The problem in this embodiment is a multi-class classification problem, in which it is desired to separate K (in the specific embodiment K=6) different load levels (L1, L2, . . . , LK with L1<L2< . . . <LK). A framework where K−1 different logistic regression classifiers ($f_1, f_2, \ldots, f_{K-1}$) are constructed is set to assign a class for a new observation $\bar{x}$, as follows:

TABLE 1

| Function | Class 0 samples | Class 1 samples |
|---|---|---|
| $f_1$ | L2, L3, . . . , LK-1, LK | L1 |
| $f_2$ | L3, . . . , LK-1, LK | L1, L2 |
| . | . | . |
| $f_{K-2}$ | LK-1, LK | L1, L2, . . . , LK-2 |
| $f_{K-1}$ | LK | L1, L2, . . . , LK-2, LK-1 |

The K−1 classifiers are then exploited as follows to perform the classification:
if $f_1(\bar{z}) \geq 0.5$ then the class L1 is assigned, otherwise $f_2$ is tested,
if $f_2(\bar{z}) \geq 0.5$ then the class L2 is assigned, otherwise $f_3$ is tested,
. . .
if $f_{K-2}(\bar{z}) \geq 0.5$ then the class LK−2 is assigned, otherwise $f_{K-2}$ is tested,
if $f_{K-1}(\bar{z}) \geq 0.5$ then the class LK−1 is assigned, otherwise the class LK is tested.

In the specific embodiment therefore, the input parameters are, considering the parameters taken during 4 different commutations:

TABLE 2

| |
|---|
| Torque_Int = [$x_1$ $x_2$ $x_3$ $x_4$] |
| Sample = [$y_1$ $y_2$ $y_3$ $y_4$] |
| Energy = [$z_1$ $z_2$ $z_3$ $z_4$] |
| Torque_diff = [$w_1$ $w_2$ $w_3$ $w_4$] |

Considering that 6 classes to identify are present and 4 parameters, a matrix of 25 coefficients is to be built.

$$\begin{pmatrix} a_1 & a_2 & a_3 & a_4 & a_5 \\ b_1 & b_2 & b_3 & b_4 & b_5 \\ c_1 & c_2 & c_3 & c_4 & c_5 \\ d_1 & d_2 & d_3 & d_4 & d_5 \\ e_1 & e_2 & e_3 & e_4 & e_5 \end{pmatrix}$$

Once defined the coefficients, the procedure described below, with reference to FIG. 12, is preferably to be followed.

The first step is to define the class for each commutation.

1$^{st}$ Commutation Calculation $$f_1 = a_1 + a_2 \cdot x_1 + a_3 \cdot y_1 + a_4 \cdot z_1 + a_5 \cdot w_1$$

if $f_1 > 0$ then class=0 $\Rightarrow$ Analyze 2$^{nd}$ commutation
if $f_1 \leq 0$ $\Rightarrow$ Analyze 2$^{nd}$ classifier $f_2$ $$f_2 = b_1 + b_2 \cdot x_1 + b_3 \cdot y_1 + b_4 \cdot z_1 + b_5 \cdot w_1$$

if $f_2 > 0$ then class=2 $\Rightarrow$ Analyze 2$^{nd}$ commutation
if $f_2 \leq 0$ $\Rightarrow$ Analyze 3$^{rd}$ classifier $f_3$ $$f_3 = c_1 + c_2 \cdot x_1 + c_3 \cdot y_1 + c_4 \cdot z_1 + c_5 \cdot w_1$$

if $f_3 > 0$ then class=4 $\Rightarrow$ Analyze 2$^{nd}$ commutation
if $f_3 \leq 0$ $\Rightarrow$ Analyze 4$^{th}$ classifier $f_4$ $$f_4 = d_1 + d_2 \cdot x_1 + d_3 \cdot y_1 + d_4 \cdot z_1 + d_5 \cdot w_1$$

if $f_4 > 0$ then class=6 $\Rightarrow$ Analyze 2$^{nd}$ commutation
if $f_4 \leq 0$ $\Rightarrow$ Analyze 5$^{th}$ classifier $f_5$ $$f_5 = e_1 + e_2 \cdot x_1 + e_3 \cdot y_1 + e_4 \cdot z_1 + e_5 \cdot w_1$$

if $f_5 > 0$ then class=8 $\Rightarrow$ Analyze 2$^{nd}$ commutation
if $f_5 \leq 0$ then class=10

The described approach for the 1$^{st}$ commutation has to be followed for the other 3 commutations.

Once defined the class for each commutation, a decision policy based on majority is a majority is applied to choose the final load amount level.

The final class is the mode of the all class commutations. This means the final class is the most represented one. Furthermore if two classes are equal "winners", the larger one is chosen.

Several predictions have been made changing the number of considered commutations.

In the table below are reported the classification rate performances, i.e., the amount of loads classified correctly over the total amount. These results have been achieved on a dataset of 103 tests and are reported as a mean over K=1000 Monte Carlo simulations. The results depends on how many commutations have been taken into account, that is, the parameters of operating conditions of the washing machine during 4, 5, 6 . . . . Up to 10 commutations.

TABLE 3

| | Commutations allowed: | | | | | |
|---|---|---|---|---|---|---|
| 4 | 5 | 6 | 7 | 8 | 9 | 10 |
| Classification Rate 97.74% | 97.91% | 98.76% | 98.67% | 98.94% | 99.41% | 98.79% |

FIGS. 13 and 14 show the corresponding confusion matrices for the 4 and 9 commutation cases.

As clear from FIGS. 13 and 14, the method of the invention is capable of predicting the correct weight class with a high accuracy.

Figures 15A, 15B:
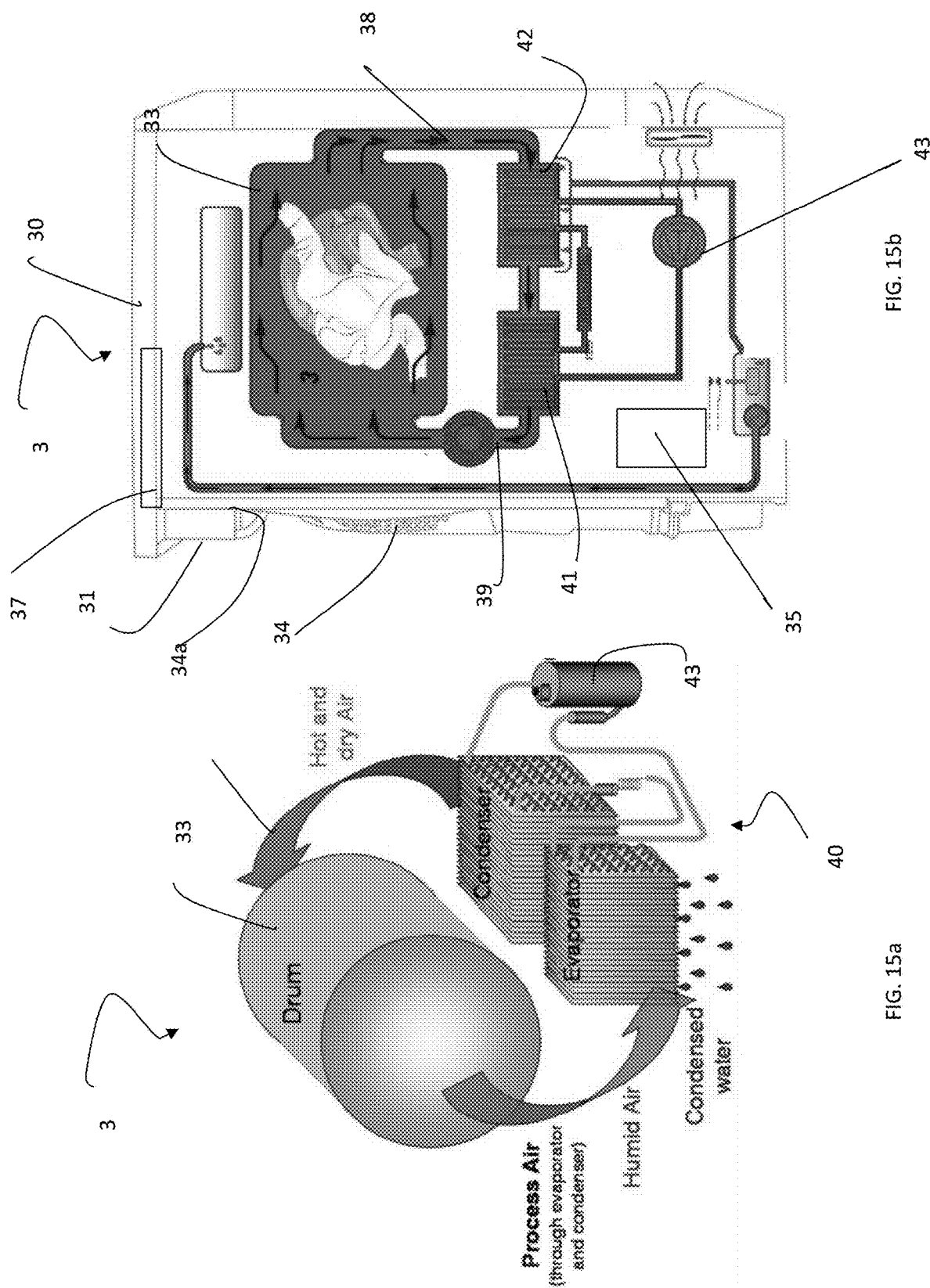
FIGS. 15a and 15b are a schematic isometric view and lateral view in section of a third embodiment of the laundry treatment appliance of the invention.

FIGS. 15a and 15b shows a laundry dryer 3 according to an embodiment of the invention. Preferably, laundry dryer 3 comprises an outer box or casing 30, preferably but not necessarily parallelepiped-shaped, and a treating chamber, such as a drum 33, for example having the shape of a hollow cylinder, for housing the laundry and in general the clothes and garments to be dried. The drum 33 is preferably rotatably fixed to the casing 30, so that it can rotate around a preferably horizontal axis R (in alternative embodiments, rotation axis may be tilted). Access to the drum 33 is achieved for example via a door 34, preferably hinged to casing 30, which can open and close an opening 34a realized on the casing itself.

Laundry dryer 3 also preferably comprises an electrical motor assembly 35 for rotating, on command, revolving drum 33 along its axis inside casing 30.

Further, laundry dryer 3 may include an electronic central control unit 37 which controls both the electrical motor assembly 35 and other components of the dryer 3 to perform, on command, one of the user-selectable drying cycles preferably stored in the same central control unit. The programs as well other parameters of the laundry dryer 3, or alarm and warning functions can be set and/or visualized in a control panel 31, preferably realized in a top portion of the dryer 3, such as above door 34.

Dryer 3 additionally includes a process air circuit which comprises the drum 33 and an air process conduit 38, depicted as a plurality of arrows showing the path flow of a process air stream through the dryer 1 (see FIGS. 15a and 15b). Process air circuit also includes a fan or blower 39.

A dedicated motor can be coupled to the fan 39, but in a possible simpler implementation the same motor can operate the fan 39 and the drum 33 (in other words only one of the two motors can be present, such as motor 35).

The dryer 3 of the invention additionally comprises a process air generator, in the depicted embodiment a heat pump system 40 including a first heat exchanger (called also condenser) 41 and a second heat exchanger (called also evaporator) 42. Heat pump 40 also includes a refrigerant closed circuit (partly depicted) in which a refrigerant fluid flows, when the dryer 3 is in operation, cools off and may condense in correspondence of the condenser 41, releasing heat, and warms up, in correspondence of the second heat exchanger (evaporator) 42, absorbing heat. A compressor 43 receives refrigerant in a gaseous state from the evaporator 42 and supplies the condenser 41, thereby closing the refrigerant cycle. In the following the heat exchangers are named either condenser and evaporator or first and second heat exchanger, respectively. More in detail, the heat pump circuit connects via piping the second heat exchanger (evaporator) 42 via a compressor 43 to the condenser 31. The outlet of condenser 41 is connected to the inlet of the evaporator 42 via an expansion device, such as a choke, a valve or a capillary tube.

Compressor 43 is driven by an electric motor (not visible in the figures), preferably integrated with the compressor in the same housing. Preferably, the compressor is a variable speed compressor so that the compressing velocity can be modified.

Preferably, in correspondence of evaporator 42, the laundry dryer 3 of the invention may include a condensed-water canister (also not visible) which collects the condensed water produced, when the dryer 3 is in operation, inside evaporator 42 by condensation of the surplus moisture in the process air stream arriving from the drying chamber (i.e. drum) 3. The canister is located at the bottom of the evaporator 42. Preferably, through a connecting pipe and a pump (not shown in the drawings), the collected water is sent in a reservoir located in correspondence of the highest portion of the dryer 3 so as to facilitate a comfortable manual discharge of the water by the user of the dryer 3.

The condenser 41 and the evaporator 42 of the heat pump 40 are located in correspondence of the process air conduit 38 formed in a basement 324 of the casing 30.

The control unit 37 includes a processor, such as a microcontroller, is present, to control the functioning of the dryer and storing program cycles to be selected by a user from the control panel 32. The control unit 37 stores also a proper algorithm in order to predict a weight of the laundry introduced inside the drum 33.

Further, the washing machine includes a plurality of sensors (not visible in the drawings) apt to sense values or parameters indicating the operating conditions of the dryer 3 during its functioning.

In order to select the prediction algorithm for the prediction in a data driven soft sensor stored in the control unit 37 and of the parameters to be sensed and to be given as inputs in the prediction algorithm, a fourth and a fifth dataset of data available where a plurality of parameters that can be sensed by sensors in the dryer and the corresponding measured value of the weight of the laundry have been used. These fourth and fifth dataset have been obtain in field tests on the dryer.

The fourth dataset includes 304 tests and the fifth dataset includes 84 tests; they are different in terms of hardware setup and parameters sensed and used as inputs in the prediction algorithm. Another dataset has been studied separately in order to estimate only the initial moisture of the laundry introduced in the drum; it is called "Dataset synthetic" and the load "synthetic" for its tests is unique: 3.5 Kg.

From data provided in the fourth and fifth datasets, Ydry (nominal weight, that is the weight of the wet laundry) is known, thus the equivalent wet load classes are determined using Ydry and rounding up the equality Ywet=Ydry+60% (Ydry). In this way, there are 7 classes (i-vii) and the 60% of initial moisture is taken into account to distinguish between Ywet classes according to common policy in dryers.

The parameters used as inputs in the algorithm are in the fourth dataset relative to operating conditions of the motor, of the compressor of the heat pump and of the humidity sensor during the selected drying program. The fifth dataset includes only parameters indicating operating conditions of the humidity sensor.

The Supervised Learning problem is solved using regression and in this perspective the essential input matrix is the Design matrix belonging to $R^{N \times p}$, where p is the number of predictors (features extracted from signals) and N is the total amount of tests available.

Similarly, the output matrix Y is the concatenation of load or humidity observations; it will be indicated as Ywet, Ydry or Yhum depending on the output selected.

The method of the invention implements estimation procedures that are deployable in firmware program, in this regard some simple features have been computed to summarize the entire information inherent in all signals provided. In the following Table the parameter chosen (115 in total) are described in details: practically speaking they are maximum or minimum values and relative positions, means or variances, slopes or integrals in different time intervals.

The parameters sensed and used, either in the fourth dataset (where all parameters have been used) or in the fifth dataset (where only the parameters of the humidity sensor have been used) are the following:

max1-power-noise-f-ha max value in [50,80]s
ta-power-noise-f-ha descent time after 50 s
tb-power-noise-f-ha rise time after 50 s
initial-power-noise-f-ha value at tb
final-power-noise-f-ha value at stop-time
min2-power-noise-f-ha min value in [tb,stop-time]s
max2-power-noise-f-ha max value in [tb,stop-time]s
posmax2-power-noise-f-ha max value position in [tb, stop-time]s
mean2-power-noise-f-ha mean value in [tb,stop-time]s
var2-power-noise-f-ha variance in [tb,stop-time]s
max1-power-noise-f-la max value in [1,80]s
ta-power-noise-f-la descent time after 50 s
tb-power-noise-f-la rise time after 50 s
initial-power-noise-f-la value at tb
final-power-noise-f-la value at stop-time
min2-power-noise-f-la min value in [tb,stop-time]s
max2-power-noise-f-la max value position in [tb,stop-time]s
posmax2-power-noise-f-la mean value in [tb,stop-time]s
mean2-power-noise-f-la variance in [tb,stop-time]s
var2-power-noise-f-la variance in [tb,stop-time]s
temp-iniziale-comp-cond initial value at start-time (temperature)
min-comp-cond min value in [start-time, stop-time]s
posmin-comp-cond min value position in [start-time, stop-time]s
temp-finale-comp-cond final value at stop-time (temperature)
var1-comp-cond variance in [start-time, tmin]s; tmin=mean value time
var2-comp-cond variance in [tmin, stop-time]s; tmin=mean value time
slope1-fcv-energy signal slope in [1, 70]s
slope2-fcv-energy signal slope in [100, stop-time]s
var1-fcv-motor-speed variance in [7, 65]s
var2-fcv-motor-speed variance in [97, stop-time]s
max1-fcv-motor-speed max value in [64, 82]s
var1-fcv-st-power variance in [7, 65]s
var2-fcv-st-power variance in [97, stop-time]s
max1-fcv-st-power max value in [7, 65]s
max2-fcv-st-power max value in [70, 87]s
max3-fcv-st-power max value in [87, stop-time]s
var1-fcv-st-torque variance in [7, 65]s
var2-fcv-st-torque variance in [97,stop-time]s
mean1-fcv-st-torque mean value in [7, 65]s
mean2-fcv-st-torque mean value in [97,stop-time]s
max1-fcv-st-torque max value in [70, 83]s
max2-fcv-st-torque max value in [83, 100]s
temp-iniziale-ntc-A initial value at start-time (temperature)
temp-finale-ntc-A final value at stop-time (temperature)
max1-ha-filt-ha max value in [50, stop-time]s
max1-ha-filt-la max value in [200, stop-time]s
max1-ha-filt-noise max value in [start-time, stop-time]

mean1-ha-filt-noise mean value in [start-time, stop-time]
var1-ha-filt-noise variance in [start-time, stop-time]
min-mean-ha-min-signal min value if thsd is not reached, mean value otherwise
outlier-ha-min-signal logic value; 1=thsd reached
min-mean-ha-aver-data min value if thsd is not reached, mean value otherwise
min-mean-ha-max-signal min value if thsd is not reached, mean value otherwise
first-nonnull-ha-init-offset first non zero value
max1-ha-noise max value in [start-time, 200]
max-ha-min-signal-ha max value in [start-time, stop-time]
mean-ha-min-signal-ha mean value in [start-time, stop-time]
var-ha-min-signal-ha variance in [start-time, stop-time]
max-hum-sens-shot-cnt max value in [start-time, stop-time]
min-hum-sens-shot-cnt min value in [start-time, stop-time]
diff-hum-sens-shot-cnt max-min in [start-time, stop-time]
max-hum-sens-space max value in [start-time, stop-time]
mean-hum-sens-space min value in [start-time, stop-time]
mean-ha-signals-and-thsd mean value in [start-time, stop-time]
var-ha-signals-und-thsd variance in [start-time, stop-time]
var-hum-sens-space variance in [start-time, stop-time]
final-value1-ha-filt-noise-LPF final value at stop-time
slope1-ha-signals-and-thsd-LPF signal slope in [100, 120]s
slope1-hum-peak-cnt-double-LPF signal slope in [100, 120]s
slope1-hum-sens-shot-cnt-LPF signal slope in [100, 120]s
final-value1-hum-sens-space-LPF final value at stop-time
max-ntc-A max value in [start-time, time-end]s
pos-max-ntc-A max value position in [start-time, time-end]s
mean-ntc-A mean value in [1000, time-end]s
var-ntc-A variance in [1000, time-end]s
max-ha-aver-data max value in [1000, time-end]s
pos-max-ha-aver-data max value position in [1000, time-end]s
crossing-time-ha-main-signal time when signal value reaches thsd=2,5e04
crossing-time-ha-min-follow time when signal value reaches thsd=1e05 2
mean-ha-noise mean value in [1000, time-end]s
var-ha-noise variance in [1000, time-end]s
final-value-ha-noise final value in [start-time, time-end]s
crossing-time-ha-min-signal-ha time when signal value reaches thsd=2e05
crossing-time-ha-filt-ha time when signal value reaches thsd=2e05
crossing-time-ha-filt-la time when signal value reaches thsd=3e05
max-le-power-noise-f-ha max value in [1000, time-end]s
pos-max-le-power-noise-f-ha max value position in [1000, time-end]s
mean-le-power-noise-f-ha mean value in [1000, time-end]s
var-le-power-noise-f-ha variance in [1000, time-end]s
max-le-power-noise-f-la max value in [1000, time-end]s
pos-max-le-power-noise-f-la max value position in [1000, time-end]s
mean-le-power-noise-f-la mean value in [1000, time-end]s
var-le-power-noise-f-la variance in [1000, time-end]s
mean-fcv-st-power mean value in [1000, time-end]s
var-fcv-st-power variance in [1000, time-end]s
mean-fcv-st-torque mean value in [1000, time-end]s
var-fcv-st-torque variance in [1000, time-end]s
mean-fcv-motor-speed mean value in [1000, time-end]s
var-fcv-motor-speed variance in [1000, time-end]s
speed-integral-fcv-motor-speed cumsum of values in [1000, time-end]
slope-fcv-energy signal slope in [900, 1000]s
mean-comp-cond-exit-temp mean value in [1000, time-end]s
var-comp-cond-exit-temp variance in [1000, time-end]s
crossing-time-ha-filt-noise-LPF time when signal value reaches thsd=2e04
max-hum-peak-normal-cnt-LPF max value in [start-time, time-end]s
pos-max-hum-peak-normal-cnt-LPF max value position in [start-time, time-end]s
crossing-time-ha-max-signal-LPF time when signal value reaches thsd=1e05
crossing-time-ha-min-signal-LPF time when signal value reaches thsd=6e03
max-ha-signals-und-thsd-LPF max value in [start-time, time-end]s
pos-max-ha-signals-und-thsd-LPF max value position in [start-time, time-end]s
max-hum-peak-cnt-double-LPF max value in [start-time, time-end]s
pos-max-hum-peak-cnt-double-LPF max value position in [start-time, time-end]s
max-hum-sens-shot-cnt-LPF max value in [start-time, time-end]s
pos-max-hum-sens-shot-cnt-LPF max value position in [start-time, time-end]s
crossing-time-hum-sens-space-LPF time when signal value reaches thsd=0,5

A subset of these parameters can be used as well.

Results are shown for two algorithms, LASSO and ridge regression, which have been trained using the fourth dataset where all parameters are present. The prediction of the initial wet load (Ywet), which is a fast prediction being at the beginning of the cycle, the prediction of the dry load (Ydry) which needs a good accuracy determining the end of the cycle, and a humidity prediction (Yhum) are given.

As regards the initial humidity estimation, once obtained wet and dry load estimates it is also possible to extract Yhum simply using the water content (w.c.=Ywet−Ydry) and comparing it with dry load in percentage:

$$Yhum = (w.c.) * 100 / Ydry$$

Alternatively a direct estimation of Yhum is always feasible in the same pattern available for load estimation (adjusting number and type of the classes).

Result 1

Dataset: all tests but no synthetic
Estimated output: dry load (Ydry);
Regularization technique: Ridge Regression;
Type of parameters: all parameters in the list
Design matrix: [388×101].

Figure 16:
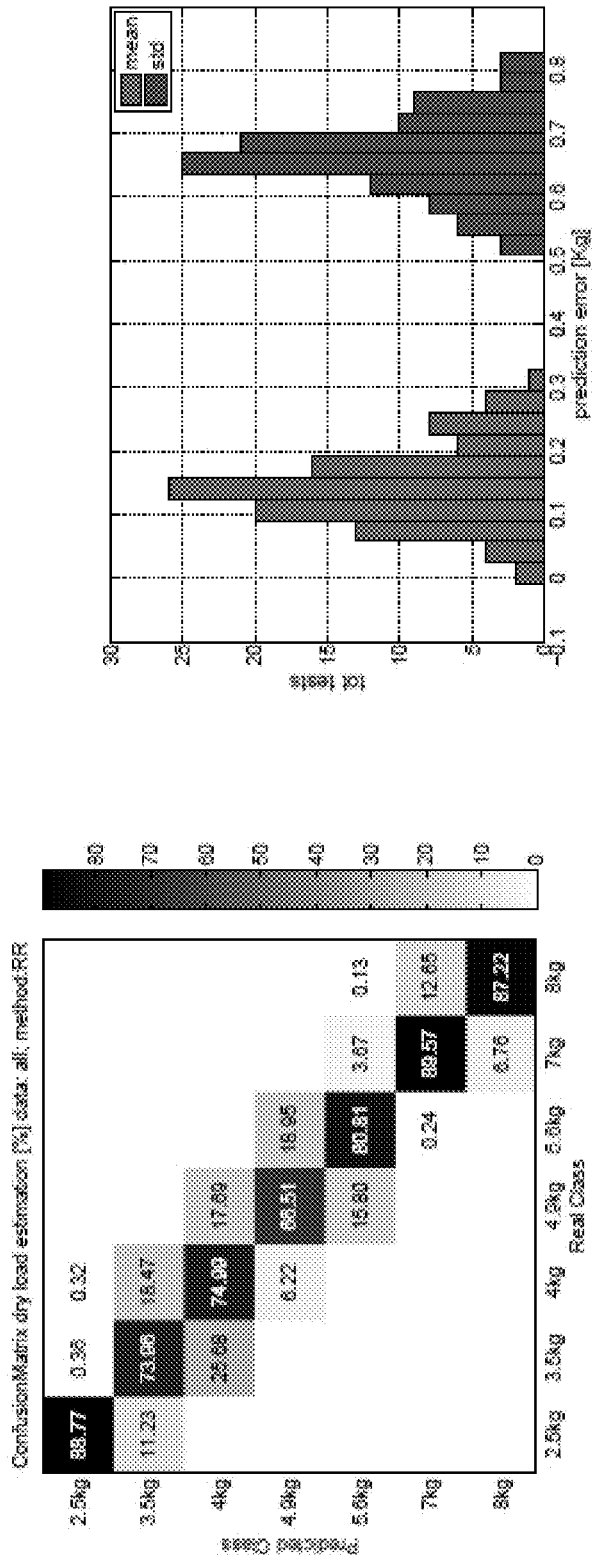
FIGS. 16a and 16b are a confusion Matrix and a prediction error histogram obtained in an embodiment of a method of the invention.

These results are summarized in FIGS. 16a and 16b.

This simulation is executed with Ridge Regression which uses all the parameters available for end-cycle estimation, thus, although this approach is not the most suitable for the implementation on dryers because of its complexity, it gives information on performances achievable with all parameters selected. The dry load estimates are evaluated precisely with a CR=82% as shown in FIG. 16a; when errors occur they remain contained around the main diagonal of the confusion matrix and therefore the lower classes are not "confused" with the upper ones.

Result 2
    Dataset: all tests but no synthetic
    Estimated output: dry load (Ydry);
    Regularization technique: LASSO Regression;
    Type of parameters: all parameters in the list
    Design matrix: [388×101].
    These results are summarized in FIGS. 17a and 17b.

LASSO regularization was employed here to compute dry load estimations using 15 predictors at most for each outer cross-validation.

Figure 17:
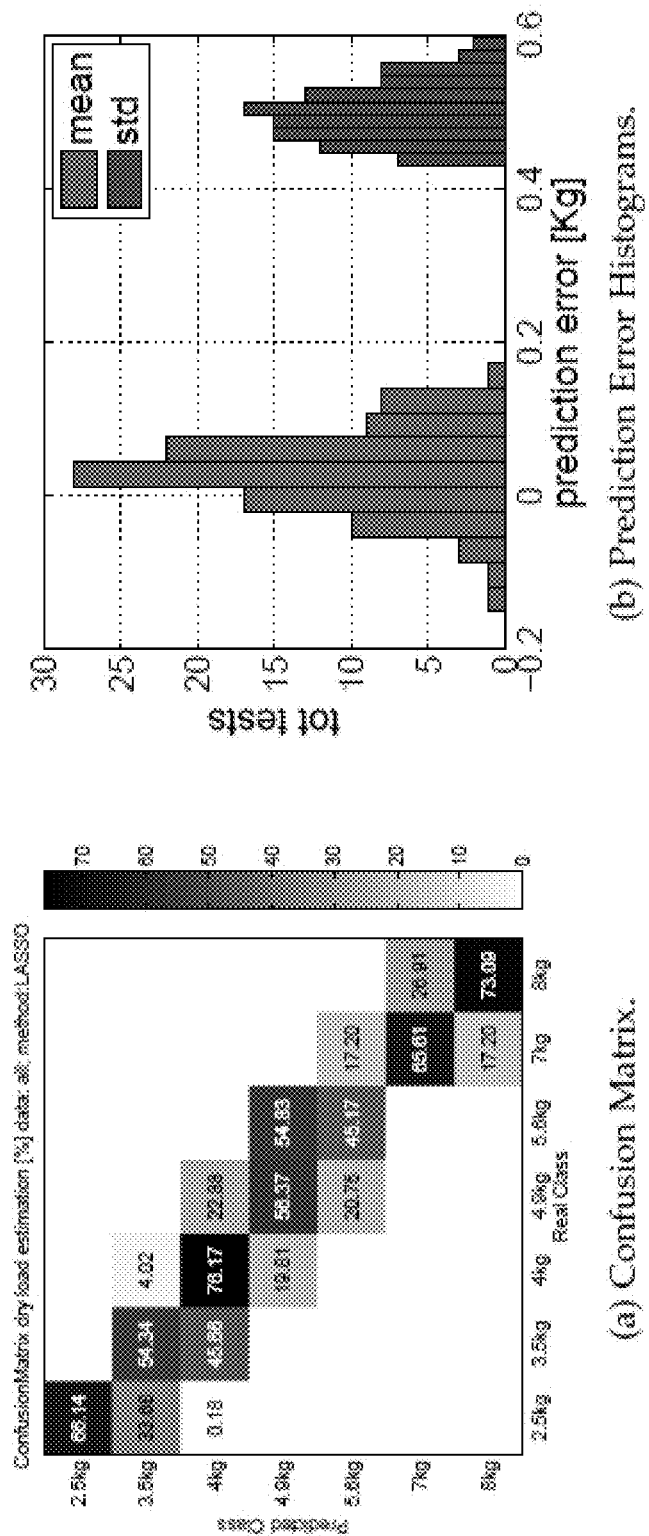
FIGS. 17a and 17b are a confusion Matrix and a prediction error histogram obtained in an embodiment of a method of the invention.

The experimental setting and final results are the same of the result 1 but the CR decreases in this case. In FIG. 17a prediction results are depicted while in FIG. 17b the histogram shows predictors selected by LASSO procedure; after a preliminary analysis the variables linked to motor speed and power together with NTC (temperature sensor) seem to be more influential to determine the dry load end-cycle estimation.

Result 3
    Dataset: all tests no synthetic;
    Estimated output: wet load (Ywet);
    Regularization technique: Ridge Regression;
    Type of signals: all parameters in the list;
    Design matrix: [388×101].
    These results are summarized in FIGS. 18a and 18b.
    Wet load estimation result: CR=80%, mean error less than 0.4 [Kg].
    All predictors have been used.

Figure 18:
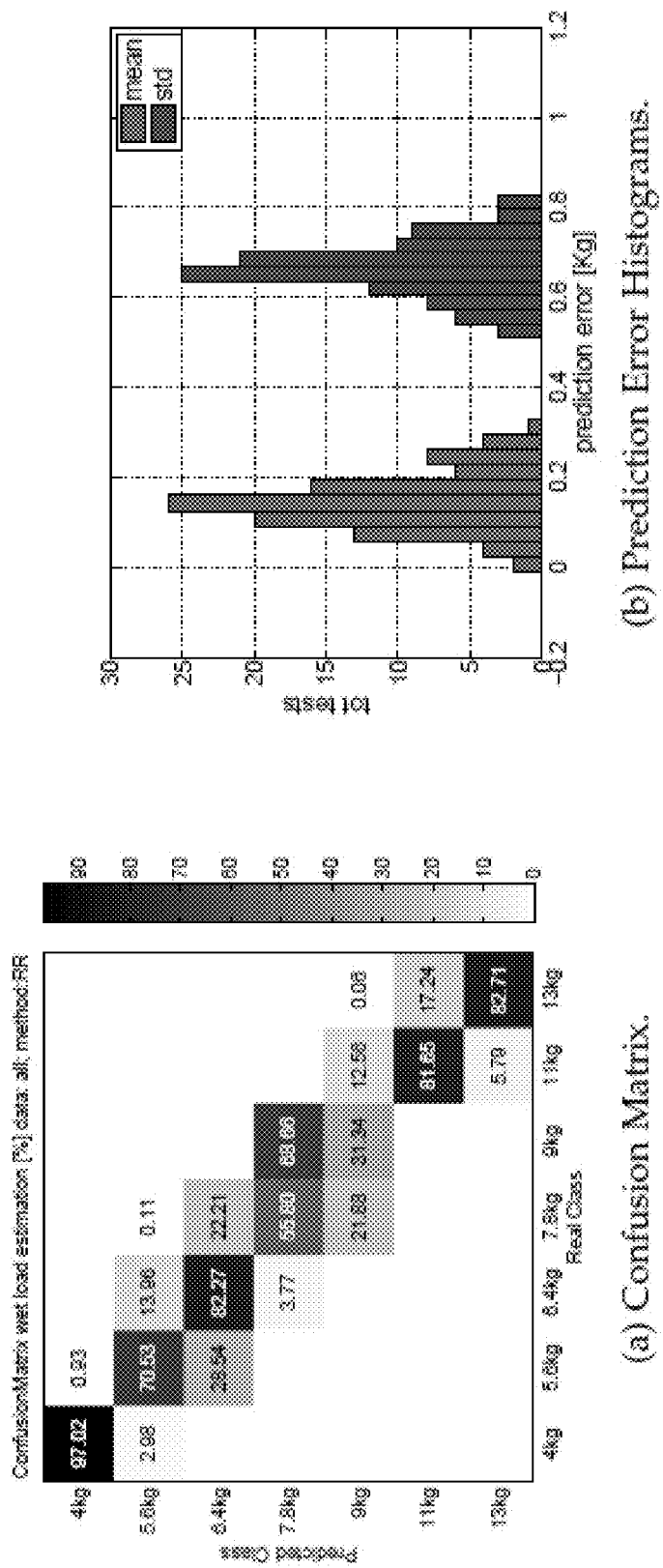
FIGS. 18a and 18b are a confusion Matrix and a prediction error histogram obtained in an embodiment of a method of the invention.

Now the goal is wet load estimation while the experimental settings and dataset remain the same of results 1 and 2. FIG. 18 reveals a loss of performance in terms of confusion matrix and mean error comparing to result 2; in particular the class 9 [Kg] are correctly evaluated under the 50% of the cases.

Figure 19:
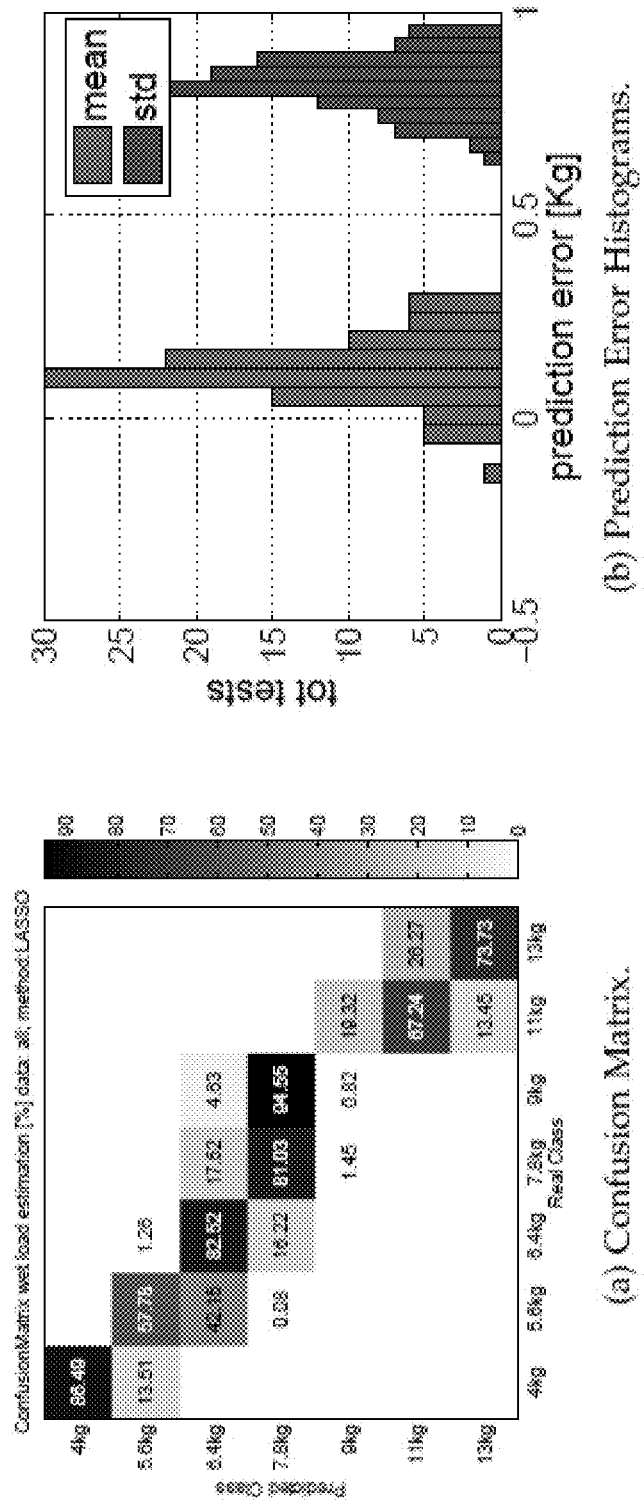
FIGS. 19a and 19b are a confusion Matrix and a prediction error histogram obtained in an embodiment of a method of the invention.

Result 4
    Dataset: all tests no synthetic;
    Estimated output: wet load (Ywet);
    Regularization technique: LASSO15 Regression;
    Type of signals: all parameters in the list;
    Design matrix: [388×101].
    Wet load estimation result: CR=73%, mean error less than 0.5[Kg].
    15 predictors have been used for each iteration.
    The results are summarized in FIGS. 19a and 19b.

In this simulation LASSO was used to determine wet load estimations; here the performance increases respect to dry load estimation in the same conditions. Also in this case closer classes are hard to classify correctly.

Result 5
    Dataset: all tests no synthetic;
    Estimated output: initial moisture (Yhum);
    Regularization technique: Ridge Regression;
    Type of signals: All parameters;
    Design matrix: [388×101].
    Results are summarized in FIGS. 20a and 20b.
    Initial moisture estimation result: CR=99%, mean error less than 0.5[%].
    All predictors have been used.

Only direct estimations of initial humidity is proposed in the thesis and in this perspective results 5 and 6 provide outcomes for Yhum (fast) detection.

Figure 20:
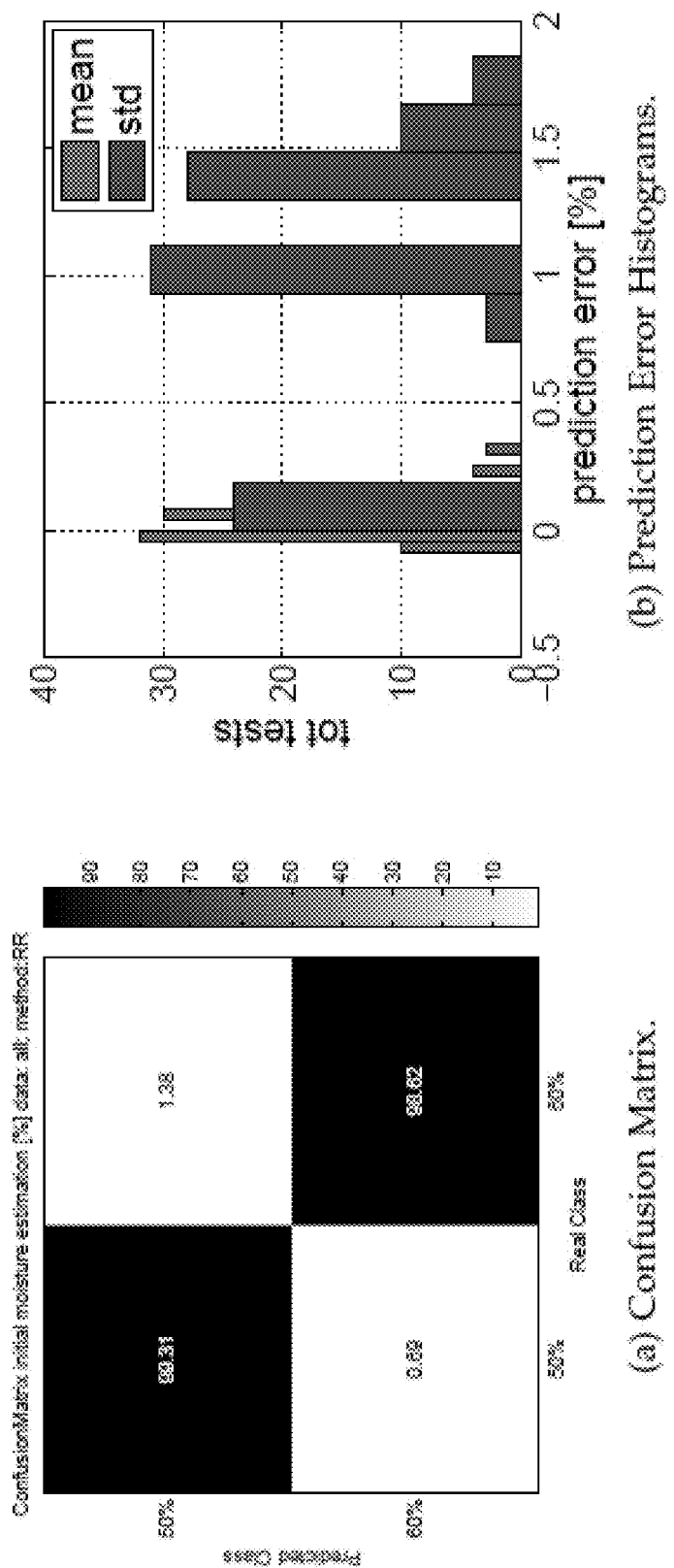
FIGS. 20a and 20b are a confusion Matrix and a prediction error histogram obtained in an embodiment of a method of the invention.

Here the goal is to distinguish between two classes only: 50% and 60% of initial moisture respect to dry load. The experimental setting and dataset are exactly the same of previous cases and results for Ridge Regression are shown in FIG. 20; similarly to load estimation case when estimates exceed the maximum feasible value, they are evaluated with 60% anyway.

Figure 21:
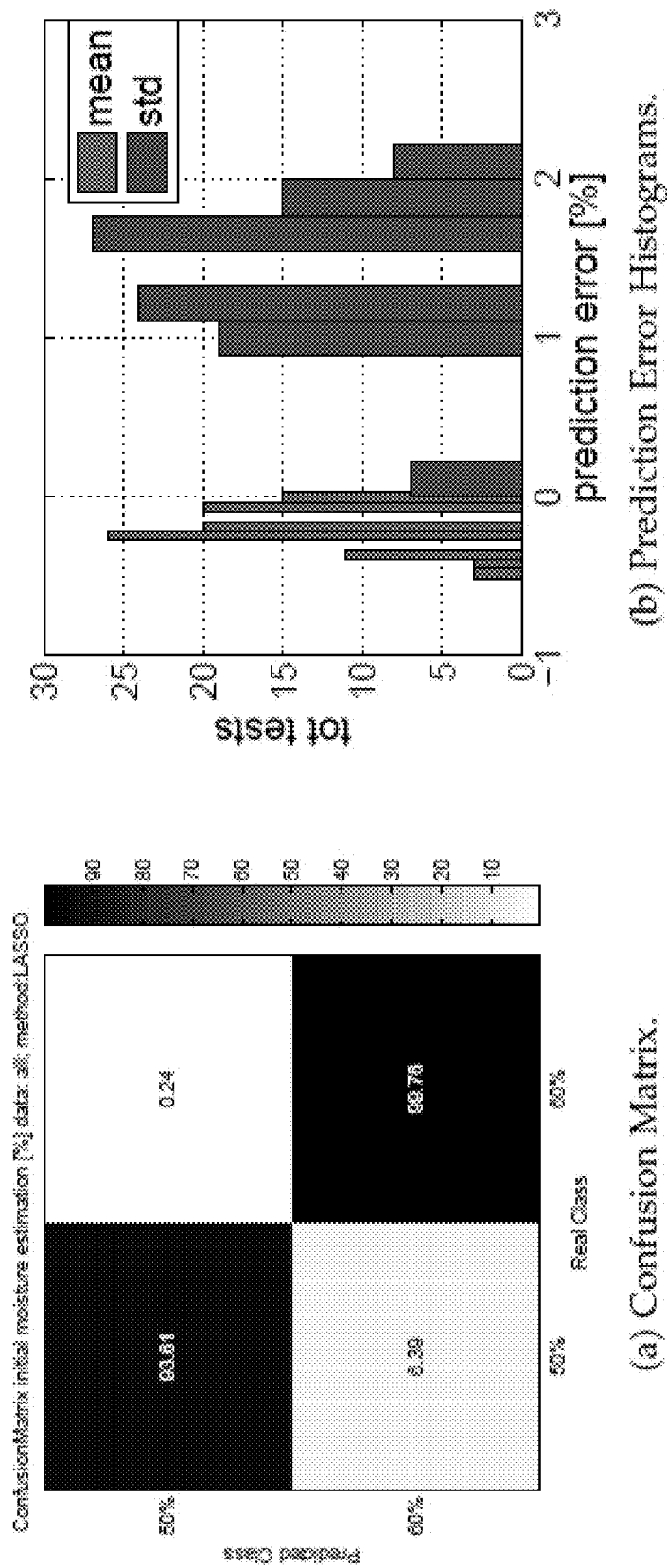
FIGS. 21a and 21b are a confusion Matrix and a prediction error histogram obtained in an embodiment of a method of the invention.

Result 6
    Dataset: all tests no synthetic;
    Estimated output: initial moisture (Yhum);
    Regularization technique: LASSO15 Regression;
    Type of signals: All parameters;
    Design matrix: [388×101].
    Results are summarized in FIGS. 21a and 21b.
    Initial moisture estimation result: CR=98%, mean error less than 0.5[%]. 15 predictors have been used for each iteration.

In this simulation LASSO regularization was used to estimate the initial moisture. Results achieved are similar to the ones of Ridge Regression (result 5) but in this case only 15 predictors are employed at most for each iteration with considerable advantages practical implementation aspects.

Parameters derived from compressor signal gain further relevance for the initial moisture estimation.

The invention claimed is:

1. A method for determining a laundry weight in a laundry treatment appliance, the method comprising:
    selecting a laundry program in the laundry treatment appliance;
    starting the selected laundry program;
    sensing a plurality of parameters indicating operating conditions of the laundry treatment appliance during the laundry program and one or more characteristics of the selected laundry program; and
    predicting a weight of the laundry present within the laundry treatment appliance based on the plurality of parameters by means of a data-driven soft sensor, wherein the predicting the weight includes using a supervised learning prediction.

2. The method according claim 1, wherein the laundry treatment appliance includes a rotatable drum and a motor to rotate the drum, and wherein the plurality of parameters includes one or more parameters indicative of operating conditions of the motor of the laundry treatment appliance.

3. The method according to claim 1, wherein the step of predicting a weight of the laundry by a supervised learning prediction includes predicting a weight of the laundry using a regression algorithm.

4. The method according to claim 3, wherein the step of predicting a weight of the laundry using a regression algorithm includes predicting a weight of the laundry using a regularized regression algorithm.

5. The method according to claim 4, wherein the step of predicting a weight of the laundry using a regularized regression algorithm includes predicting a weight of the laundry using a LASSO regression or a ridge regression.

6. The method according to claim 1, wherein the laundry treatment appliance is a horizontal axis or vertical axis laundry machine or a laundry washer-dryer including a rotatable drum and, after the step of starting the select laundry program, the method includes:
    performing a plurality of commutations of the drum, each commutation having an acceleration portion and a deceleration portion; and
    loading water into the drum;
    and the step of sensing a plurality of parameters includes:
    sensing a plurality of parameters indicating operating conditions of the laundry treatment appliance during one or more commutations.

7. The method according to claim 6, wherein the step of predicting a weight of the laundry present within the laundry treatment appliance based on the plurality of parameters by means of a data-driven soft sensor takes place before the step of loading water into the drum.

8. The method according to claim 6, wherein the step of sensing a plurality of parameters indicating operating conditions of the laundry treatment appliance during one or more commutations includes sensing the same parameters during the execution of each commutation of a plurality of commutations.

9. The method according to claim 6, wherein the prediction step based on the sensed parameters indicating operating conditions of the laundry during one or more commutations lasts less than a minute.

10. The method according to claim 1, wherein the laundry treatment appliance is a laundry dryer including a rotatable drum, and the step of predicting a weight of the laundry includes determining a weight of wet laundry and a weight of dry laundry.

11. The method according to claim 10, including, after the step of starting the laundry program, the step of blowing drying air into the drum, and the step of predicting a weight of the wet laundry is performed before the step of blowing dry air into the drum.

12. The method according to claim 1, including the step of:
determining a duration of the selected laundry program or modifying a pre-set duration of the laundry program on the basis of the predicted weight of the laundry.

13. The method according to claim 1, including the step of:
emitting a warning or a notice signal if the predicted weight of the laundry is above a pre-set threshold.

* * * * *